(12) United States Patent
Ahn

(10) Patent No.: US 11,489,667 B2
(45) Date of Patent: Nov. 1, 2022

(54) METHOD OF CORRECTING GRAVITY-INDUCED ERROR IN QUANTUM CRYPTOGRAPHY SYSTEM, METHOD OF QUANTUM CRYPTOGRAPHY AUTHENTIFICATION USING THE SAME, AND USER TERMINAL AND SERVER

(71) Applicant: University of Seoul Industry Cooperation Foundation, Seoul (KR)

(72) Inventor: Do Yeol Ahn, Seoul (KR)

(73) Assignee: FIRST QUANTUM INC., Seoul (KR)

( * ) Notice: Subject to any disclaimer, the term of this patent is extended or adjusted under 35 U.S.C. 154(b) by 0 days.

(21) Appl. No.: 17/141,674

(22) Filed: Jan. 5, 2021

(65) Prior Publication Data

US 2022/0014361 A1 Jan. 13, 2022

(30) Foreign Application Priority Data

Jul. 13, 2020 (KR) .................. 10-2020-0085801

(51) Int. Cl.
*H04L 9/08* (2006.01)
*G06F 21/31* (2013.01)

(52) U.S. Cl.
CPC ............ *H04L 9/0852* (2013.01); *G06F 21/31* (2013.01); *H04L 9/0869* (2013.01)

(58) Field of Classification Search
CPC ... H04L 9/0852; H04L 9/0855; H04L 9/0858; H04L 9/0861; H04L 9/0869; H04L 9/0872; H04L 63/061; G06F 21/31
See application file for complete search history.

(56) References Cited

U.S. PATENT DOCUMENTS

| | | | | |
|---|---|---|---|---|
| 6,473,719 B1* | 10/2002 | Steenblik | ............... | H04L 27/00 398/154 |
| 7,302,187 B1* | 11/2007 | Roberts | .................. | H04B 10/85 398/140 |

(Continued)

FOREIGN PATENT DOCUMENTS

| | | |
|---|---|---|
| JP | 2020-25196 | 2/2020 |
| KR | 10-0654426 | 12/2006 |
| KR | 10-2016-0091108 | 8/2016 |

*Primary Examiner* — Hosuk Song
(74) *Attorney, Agent, or Firm* — Kile Park Reed & Houtteman PLLC

(57) ABSTRACT

A method of correcting gravity-induced error in quantum cryptography system, which is capable of improving accuracy when an optical cable is not installed and photons are transmitted through an artificial satellite, is disclosed. The method performed by an electronic device, comprises receiving a distance (r) to a satellite that receives polarized photon from a sender and transmits the polarized photon to a receiver, receiving an angular momentum per unit mass of the satellite ($l_{obs}$), and calculating a rotation amount of the polarized photon, which is induced by a warp of space due to gravity by using the distance to the satellite and the angular momentum per unit mass of the satellite ($l_{obs}$). The rotation 2Θ of the polarized photon is calculated by the following equation, $$\sin \Theta(r) \cong -\frac{l_{obs}}{\sqrt{rr_s}}\sqrt{1-\frac{r_s}{r}},$$

wherein '$r_s$' is the Schwarzschild radius of the Earth.

12 Claims, 13 Drawing Sheets
(8 of 13 Drawing Sheet(s) Filed in Color)

(56) References Cited

U.S. PATENT DOCUMENTS

| | | | | |
|---|---|---|---|---|
| 7,849,121 B2 * | 12/2010 | Fiorentino | ............ | H04L 9/0858 |
| | | | | 708/255 |
| 8,861,735 B2 * | 10/2014 | Brodsky | ............... | H04L 9/0855 |
| | | | | 380/278 |
| 8,891,767 B2 * | 11/2014 | Zubairy | ................ | H04B 10/70 |
| | | | | 380/256 |
| 10,637,583 B2 * | 4/2020 | Henningsen | .......... | H04L 9/0852 |
| 10,726,353 B2 * | 7/2020 | Ashrafi | ................ | H04L 9/0852 |
| 10,790,913 B2 * | 9/2020 | Henningsen | ............ | H04B 10/70 |
| 2015/0055961 A1 * | 2/2015 | Meyers | ................ | H04B 10/50 |
| | | | | 398/140 |

* cited by examiner

FIG. 1B
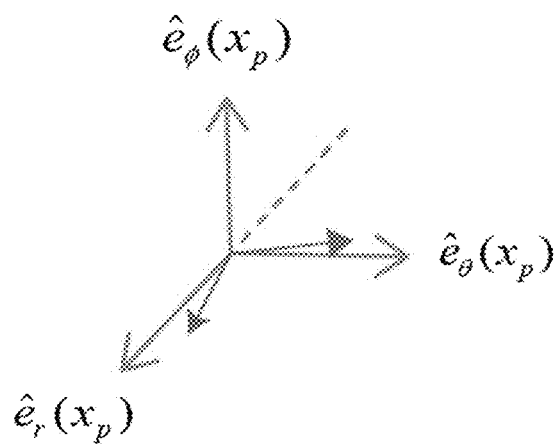
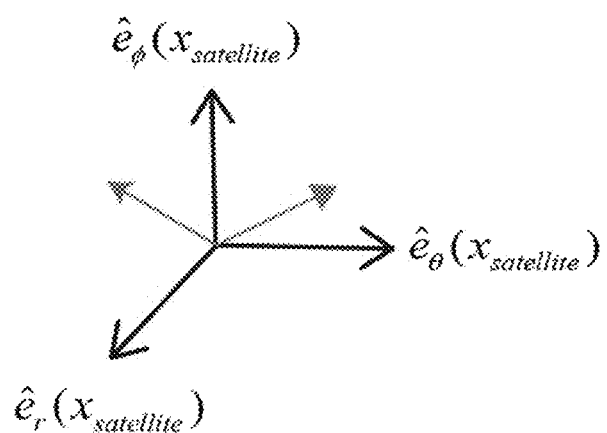

FIG. 6

| Step1: Sender generates arbitrary bits | 0 | 1 | 1 | 0 | 1 | 0 | 0 | 1 |
|---|---|---|---|---|---|---|---|---|
| Step2: Sender selects transmission filter | + | + | × | + | × | × | × | + |
| Step3: Sender transmits polarized photons | → | ↕ | ↗ | → | ↗ | ↘ | ↗ | ↕ |
| Step4: Receiver selects reception filter for receiving polarized photons | + | × | × | × | + | × | + | + |
| Step5: Receiver measures the photons | → | ↘ | ↗ | ↗ | ↕ | ↗ | ↕ | ↕ |
| Step6: Sender and Receiver share information of transmission filter and reception filter | | | | | | | | |
| Step7: Sender and Receiver generate first and second secret keys, respectively | 0 | | 1 | | | | 0 | 1 |

| Basis | 0 | 1 |
|---|---|---|
| + | → | ↕ |
| × | ↘ | ↗ |

METHOD OF CORRECTING GRAVITY-INDUCED ERROR IN QUANTUM CRYPTOGRAPHY SYSTEM, METHOD OF QUANTUM CRYPTOGRAPHY AUTHENTIFICATION USING THE SAME, AND USER TERMINAL AND SERVER

CROSS REFERENCE TO RELATED APPLICATION

This application claims priority from and the benefit of Korean Patent Applications No. 10-2020-0085801, filed on Jul. 13, 2020, which is hereby incorporated by reference for all purposes as if fully set forth herein.

BACKGROUND OF THE INVENTION

Field of the Invention

The present invention relates to a method of correcting gravity-induced error in quantum cryptography system, a method of quantum cryptography authentication using the method of correcting gravity-induced error in quantum cryptography system, and a user terminal and a server. More particularly, the present invention relates to a method of correcting gravity-induced error in quantum cryptography system based on a satellite, a method of quantum cryptography authentication using the method of correcting gravity-induced error in quantum cryptography system, and a user terminal and a server.

Discussion of the Background

Einstein's "spooky action at a distance" is quickly being forged into a global spacetime quantum communication with the recent launch of China's Micius satellite. It extends length and time scales for tests of quantum theory to relativistic distances and velocities. While it is of central importance in these environments to understand the intertwining of the quantum and gravitation theories and its effects are significant on QBER, it remains not completely understood or verified. Even an experiment in the regime where a quantum system evolves on classical curved spacetime has never been fully assessed. Here, we describe a photon state with 1a unitary irreducible representation of the Wigner Rotation to investigate geometric phases induced by gravitational field between the ground station and the satellites in the Earth Orbits for various states of observers. It is found that there are general relativistic, or classical, and the quantum component in the Wigner rotation; When an observer is in a spiraling orbit, the quantum component is obtained from 10-6 degree to 10-4 degree depending on the altitude of the Earth Orbits, which should be measurable. This quantum rotation produced by the gravitational field would be the result of intertwining of quantum and general relativity on the photon state and would open up the road to test the gravitational effects on the quantum systems.

Quantum key distribution (QKD) is the process of producing a shared random secret key between two parties (Alice and Bob), providing the ability to detect any attempt of copying the key. Due to its inherently secure properties, optical-fiber-based QKD has been implemented in several commercial devices. Furthermore, as threats for global secure key distribution have increased with the exponential growth of calculation and computing powers, free-space-based QKD systems has been actively pursued and demonstrated by various feasible studies. For example, a higher-dimensional quantum key distribution (HD-QKD) that utilizes a photon's quantized linear momentum (LM) or orbital angular momentum (OAM) states in addition to its polarization states holds advantages for free space QKD. Such a system can decrease the quantum channel's fidelity requirement while maintaining or increasing bandwidth. By taking advantage of these properties, free-space OAM-based QKD has been demonstrated across air for a distance of 210 meters.

Moreover, several proposals for quantum communication between a LEO satellite and an optical ground station have been reported such as SPACEQEST and QEYSSAt projects. Most of them have mainly considered quantum optics rather than general relativistic phenomena at large scales. However, the gravitational field adds a measurable contribution to the quantum bit error rate (QBER) along the world line of the quantum state as the altitude changes. This loss of information suggests that the gravitational field acts like a dissipative quantum channel. Especially, general relativistic effects on polarizations and linear momentum of a photon state are important for the quantum information processing in the orbital satellite. Recently, microsatellite-based quantum-limited communication experiment in an LEO-to-ground link was reported. It is found that the polarization encoding is a reasonable option for QKD with a free-space link due to its stable propagation through the atmosphere, whereas time-bin encoding is widely used in the fiber networks. A big challenge in this kind of system is polarization reference-frame synchronization between the LEO satellite and the optical ground station to implement the QKD protocol reliably in the gravitational field. While there have been works on the change of polarizations and linear momentum of a photon as it propagates through a gravitational field in a general relativistic point of view, the investigation of quantum systems with the general relativity has been mainly focused on the proper time and time dilation effect.

Describing photon states observed by a moving observer (e.g., a satellite) in curved spacetime requires the understanding of both quantum mechanics and general relativity, two essential branches of modern physics. One of the conceptual barriers for the relativistic treatment of quantum information is the difference of the role played by the wave fields and the state vectors in relativistic quantum theory. In non-relativistic quantum mechanics, the wave function of the Schrödinger's equation gives the probability amplitude which can be used to define conserved particle densities or density matrices. However, it was discovered that the relativistic equations are only indirect representations for probability waves of a single particle. In 1939, Wigner proposed the idea that the quantum states of relativistic particles can be formulated without the use of wave equations. He showed that the states of a free particle are given by a unitary irreducible representation of the Poincare group. In Wigner's formulation, relativistic-particle states in different inertial frames are related by a little group element in the irreducible representation of Poincare group, called Wigner rotation.

While Wigner's original proposal was for the special relativity, there have been several attempts to extend it to the domain of general relativity. Since extending Wigner's group to curved spacetime requires the standard directions (xyz) at every event, by introducing tetrads (frame fields) to define local coordinates, it has been shown that moving-particle states in curved spacetime are transformed into each other by the Wigner rotation. For free-space QKD systems, it induces the rotation of linear polarization of a photon observed between an earth ground station and a satellite in the near-Earth orbit. Thus, it would be a particularly important problem from not only a fundamental point of view for testing general relativistic effects on quantum theory but also an application point of view for precision quantum metrology and free space quantum communication.

In this work, it is demonstrated that the existence of non-trivial Wigner rotation experienced by photons sent from the earth ground station to a free-falling observer with non-zero angular momentum. We model the spacetime around Earth with Schwarzschild spacetime where tetrad fields can be globally defined as orientation-preserved coordinate basis and we use the (− + + +) metric signature. Furthermore, it is also assumed34 that quantum field theories on spacetimes admit a spinor structure which will be employed for the quantum state of the photon with given polarization. Considering that not much work has been done on an experimental assessment of the regime in which quantum systems evolve on classical curved space-time, our model could provide the test bed for probing the gravitational effects on the quantum system.

SUMMARY OF THE INVENTION

The problem to be solved by the present invention is to provide a method of correcting gravity-induced error in quantum cryptography system.

Another problem to be solved by the present invention is to provide a method of quantum cryptography using the method of correcting gravity-induced error in quantum cryptography system.

Another problem to be solved by the present invention is to provide a user terminal and a server for the method of quantum cryptography.

A method of correcting gravity-induced error in quantum cryptography system, which is performed by an electronic device, comprises receiving a distance to a satellite that receives polarized photon from a sender and transmits the polarized photon to a receiver, receiving an angular momentum per unit mass of the satellite, and calculating a rotation amount of the polarized photon, which is induced by a warp of space due to gravity by using the distance to the satellite and the angular momentum per unit mass of the satellite.

The rotation of the polarized photon is calculated by the following equation, $$\sin \Theta(r) \cong -\frac{l_{obs}}{\sqrt{rr_s}}\sqrt{1-\frac{r_s}{r}}$$

wherein '2Θ' is rotational amount of polarized photon, '$l_{obs}$' is the angular momentum per unit mass of the satellite, 'r' is the distance to the satellite, and '$r_s$' is the Schwarzschild radius of the Earth.

A method of quantum cryptography authentication according to an exemplary embodiment of the present invention comprises generating, by a server, an arbitrary bit, selecting, by the server, a transmission filter to transmit the arbitrary bit, transmitting, by the server, photons polarized according to the transmission filter to a satellite, selecting, by a user terminal, a reception filter to receive the photons, receiving, by the user terminal, a distance to the satellite and an angular momentum per unit mass of the satellite, calculating, by the user terminal, a rotation amount of polarized photons, which is induced by warping of space due to gravity by using the distance to the satellite and the angular momentum per unit mass of the satellite, rotating, by the user terminal, the reception filter according to of the rotation amount of the polarization, receiving, by the user terminal, polarized photons transmitted from the satellite through the reception filter, sharing information of the transmission filter and the reception filter, by the server and the user terminal, with each other, generating a first secret key by the server and a second secret key by the user terminal through the shared information of the transmission filter and the reception filter, transmitting, by the user terminal, the second secret key to the server, and checking, by the server, whether the first secret key and the second secret key match.

The user terminal calculates the rotation of the polarized photon by the following equation, $$\sin \Theta(r) \cong -\frac{l_{obs}}{\sqrt{rr_s}}\sqrt{1-\frac{r_s}{r}}$$

wherein '4Θ' is rotational amount of polarized photon, '$l_{obs}$' is the angular momentum per unit mass of the satellite, 'r' is the distance to the satellite, and '$r_s$' is the Schwarzschild radius of the Earth.

For example, the user terminal may receive the distance to the satellite and the angular momentum per unit mass of the satellite from the satellite or the server.

For example, the server and the user terminal may share the information of the transmission filter and the reception filter through a wired communication network or a wireless communication network.

For example, the transmission filter and the reception filter may be selected randomly by the server and the user terminal, respectively.

A server according to an exemplary embodiment of the present invention comprises a random bit generator, a transmission filter selection unit, a photon transmission unit, a communication unit, a secret key generator and an authentication unit. The random bit generator generates random bits. The transmission filter selection unit selects a transmission filter for transmitting polarized photon. The photon transmission unit converts the generated random bits into photons polarized through a selected transmission filter and transmits the photons. The communication unit receives information of reception filter from a user terminal and transmits information of the transmission filter information to the user terminal. The secret key generator generates a first secret key using the random bits according to the information of the reception filter and the transmission filter. The authentication unit performs a user authentication by receiving a second secret key from the user terminal and by comparing the second secret key with the first secret key.

For example, the transmission filter selection unit selects the transmission filter randomly.

A user terminal according to an exemplary embodiment of the present invention comprises a reception filter selection unit, a reception filter correction unit, a photon receiving unit, a communication unit and a secret key generator. The reception filter selection unit selects a reception filter for receiving polarized photons transmitted from a server. The reception filter correction unit corrects an angle of the reception filter. The photon receiving unit receives polarized photons from a satellite through the corrected reception filter. The communication unit receives information of a transmission filter from a server and transmits information of the reception filter to the server. The secret key generator generates a second secret key by using information of polarized photons, the information of transmission filter, and the information of the reception filter. The communication unit transmits the second secret key to the server.

For example, the reception filter correction unit calculates the rotation of the polarized photon is calculated by the following equation, $$\sin \Theta(r) \cong -\frac{l_{obs}}{\sqrt{rr_s}}\sqrt{1-\frac{r_s}{r}}$$

wherein '$l_{obs}$' is the angular momentum per unit mass of the satellite, 'r' is the distance to the satellite, and '$r_s$' is the Schwarzschild radius of the Earth, and rotates the reception filter by amount of 4Θ.

For example, the reception filter selection unit selects the reception filter randomly.

As described above, according to the present invention, when an optical cable is not installed and photons are transmitted through an artificial satellite, the accuracy of cryptographic authentication can be improved by correcting an error of polarization of photons, which is induced by curved space-time due to gravity.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1B shows the wave vector and polarization of photon in each local frame.

FIG. 6 is a view for explaining a quantum cryptography authentication method.

DETAILED DESCRIPTION OF THE ILLUSTRATED EMBODIMENTS

Figure 1A:
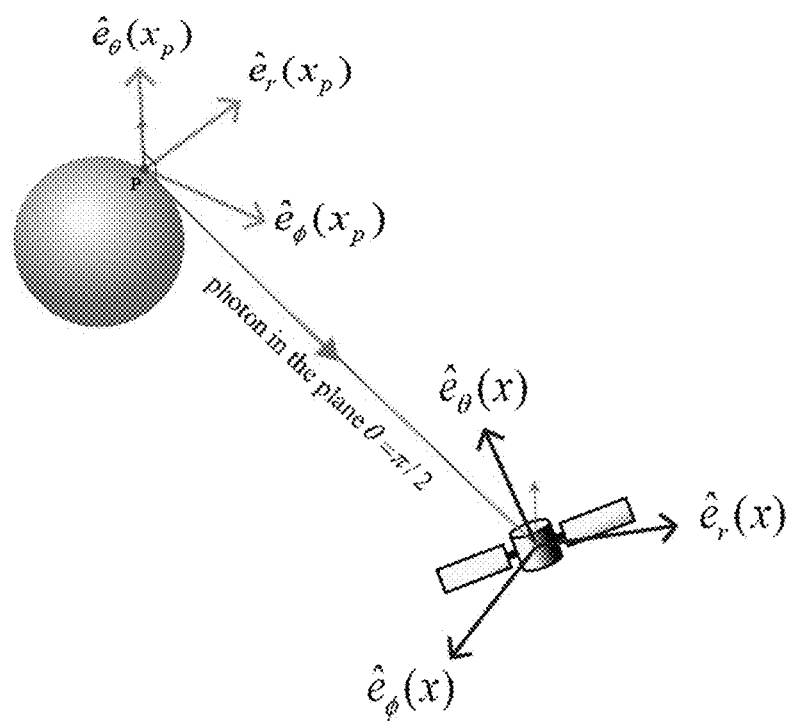
FIG. 1A shows the Earth-Satellite system and corresponding coordinates.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

Hereinafter, exemplary embodiments of the present invention will be described in detail.

Irreducible representation of the Wigner rotation

The Hilbert space vector of a photon is defined in a local inertial frame spanned by a tetrad, $$e_{\hat{a}}^{\mu}(x),$$

$\hat{a}$ and $\mu$=0, 1, 2, 3, which satisfies $g_{\mu\nu}(x) = \eta_{\hat{a}\hat{b}} e^{\hat{a}}(x) e^{\hat{b}}_{\nu}(x)$ and transforms in a way that $$\bar{e}_{\hat{a}}^{\mu}(\bar{x}) = \frac{\partial \bar{x}^{\mu}}{\partial x^{\nu}} e_{\hat{a}}^{\nu}(x) \text{ and } \bar{e}_{\hat{a}}^{\mu}(x) = \Lambda_{\hat{a}}^{\hat{b}} e_{\hat{b}}^{\mu}(x)$$

under general coordinate and local Lorentz transformations, respectively. A variation of a tetrad under an infinitesimal translation from x to x+δx is described by parallel transport to compare two vectors in a same tangent plane without a change of the vectors such that $$\delta(e_{\hat{a}}^{\mu}) = \bar{e}_{\hat{a}}^{\mu}(x + \delta x) - \bar{e}_{\hat{a}}^{\mu}(x) \to \delta x^{\lambda} \nabla_{\lambda} e_{\hat{a}}^{\mu}(x). \tag{1.}$$

For the case that wave vector of a photon is measured in the observer's laboratory, local covariant components of the wave vector, $k_{\hat{a}}(x) e_{\hat{a}}^{\mu}(x) k_{\mu}(x)$, (are changed along the photon's geodesic from $x^{\mu}$ to $x^{\mu}+k^{\mu}(x)\delta\xi$ such that $$\delta k_{\hat{a}}(x) = \delta(e_{\hat{a}}^{\mu}(x)) k_{\mu}(x) + e_{\hat{a}}^{\mu}(x) \delta k_{\mu}(x); \delta k_{\mu}(x) = d\xi \nabla_{k} k_{\mu}(x) \tag{2.}$$

Since a photon state in curved space-time follows a null geodesic in the geometric optics limit[13,14,31] and a local infinitesimal change of a tetrad is antisymmetric[25,29], Eq(2) can be rewritten as $$k_{\hat{a}}(x) \to k_{\hat{a}}'(x) = k_{\hat{a}}(x) + \delta k_{\hat{a}}(x) = (\delta_{\hat{a}}^{\hat{b}} + \lambda_{\hat{a}}^{\hat{b}}(x) d\xi) k_{\hat{b}}(x) \Lambda_{\hat{a}}^{\hat{b}}(x)$$
$$k_{\hat{b}}(x) \tag{3.}$$

where $\lambda_{\hat{a}}^{\hat{b}}(x) (\nabla_{k} e_{\hat{a}}^{\nu}(x)) e_{\nu}^{\hat{b}}(x)$. In other words, the effect of an infinitesimal translation can be considered as an infinitesimal local Lorentz transformation given by $\Lambda_{\hat{a}}^{\hat{b}}(x) = \delta_{\hat{a}}^{\hat{b}} + \lambda_{\hat{a}}^{\hat{b}}(x)$. Throughout the paper, we use the hatted Latin and Greek letters for local inertial and general coordinates, respectively.

A Lorentz transformation, Λ, has the one-dimensional representations for a photon state with the helicity, σ, given by[35]

$$U(\Lambda)|k,\sigma\rangle = \sum_{\sigma'} D_{\sigma'\sigma}(W(\Lambda,k))|\Lambda k,\sigma'\rangle \tag{4.}$$

W(Λ, k) is the Wigner's little group element, defined as W(Λ,k)=L⁻¹(Λk)ΛL(k) and D(W) is the irreducible representation of W. L(k) is the Lorentz transformation such that L(p)k=p. Accordingly, a displacement of a photon state leads to a quantum phase called Wigner rotation angle (WRA). To get an explicit expression of the irreducible unitary representation of a Lorentz transformation, we use the canonical group homomorphism between the proper Lorentz group and its double cover, SL(2, ℂ); a wave vector k of a photon is mapped to a Hermitian matrix K via K=$\sigma_{\hat{a}}k^{\hat{a}}$, where $\sigma_{\hat{a}}$, â=1, 2, 3 are the Pauli matrices and $\sigma_{\hat{0}}$ is the 2×2 identity matrix. A Lorentz transformation is represented by the similarity transformation such that $$AKA^{\dagger} = \Lambda^{\mu}{}_{\nu}k^{\nu}\sigma_{\mu} \tag{5.}$$

with an element A of SL(2, ℂ). The corresponding irreducible unitary representation of the little group element for a massless particle is[32,36]

$$e^{i(\psi(\Lambda,k))} = \left(\frac{[\alpha(1+n^3)+\beta n_+]b + [\gamma(1-n^3)+\delta n_+]c^*}{a\sqrt{b(1+n^3)}}\right)^2, \tag{6.}$$

where Ψ(Λ, k) is the WRA. Detailed expressions for a, b, c, d, α, β, γ, and δ are given in the Supplementary Information (SI). Thus, A local infinitesimal Lorentz transformation, Λ(x), leads to an infinitesimal Wigner rotation (IWR) and the total Wigner rotation can be obtained by a time ordered integration of IWRs over the geodesic trajectory x(ξ) of the photon such that $$e^{i\psi(\Lambda,\hat{n})} = T \exp\left[i\int \tilde{\psi}\%(\Lambda(x(\xi)), \hat{n}^i(\xi))d\xi\right], \tag{7.}$$

where $\hat{n}^i = k^i(x)/k^0(x)$ and T is the time ordering operator. $\tilde{\psi}$ and $\psi$ are infinitesimal and total WRA, respectively. In addition, it is well known that under a LTΛ, the polarization vector, $e_{\phi}{}^{\hat{a}}$, is transformed in the standard frame such that $$e_{\phi'}{}^{\hat{a}} = R_{\hat{z}}(\psi(\Lambda,\hat{n}^i))e_{\phi}{}^{\hat{a}}; \phi' = \phi + \psi(\Lambda,\hat{n}^i) \tag{8}$$

In the above formula, $R_{\hat{Z}}(\psi)$ represents the rotation about $\hat{Z}$-axis by the total WRA.

Model

Figure 1C:
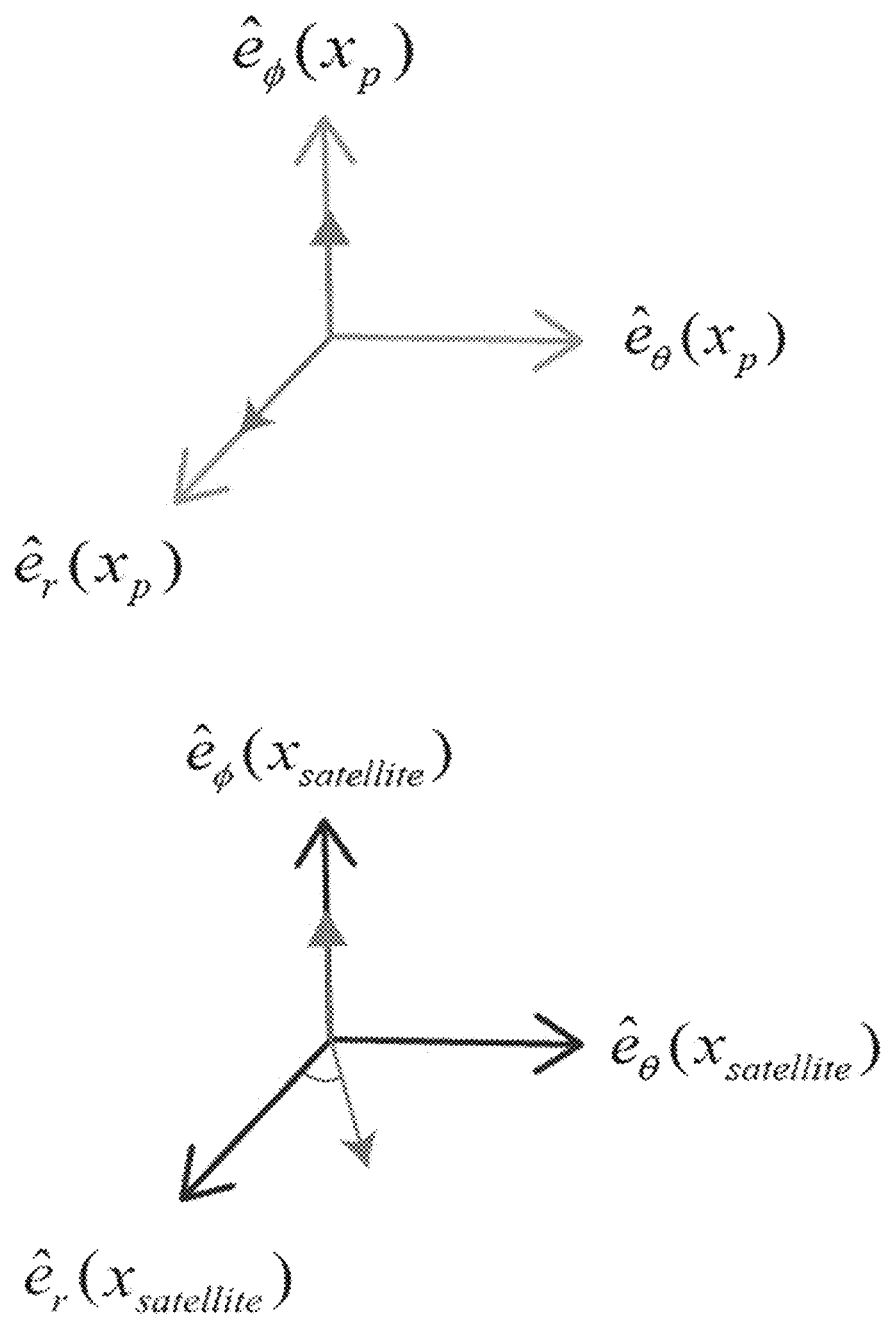
FIG. 1C shows the wave vector and polarization of photon in the standard frame in comparison with FIG. 1B.
Figure 2A:
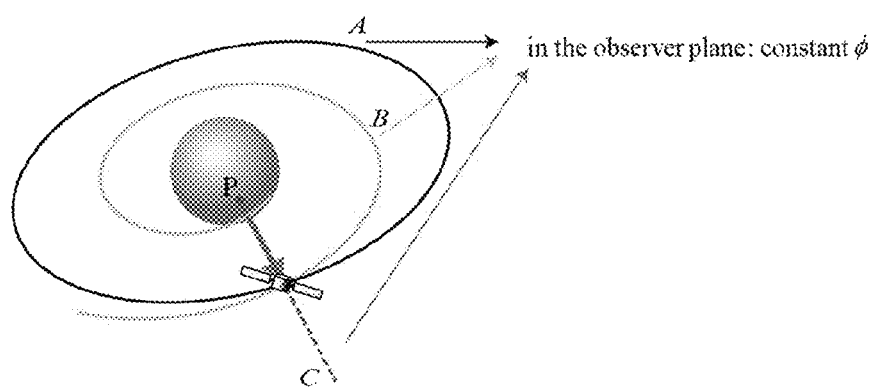
FIGS. 2A and 2B show schematics of the trajectory of the observer (satellite) and photon with non-zero angular momentum in a spiraling orbit.
Figure 2B:
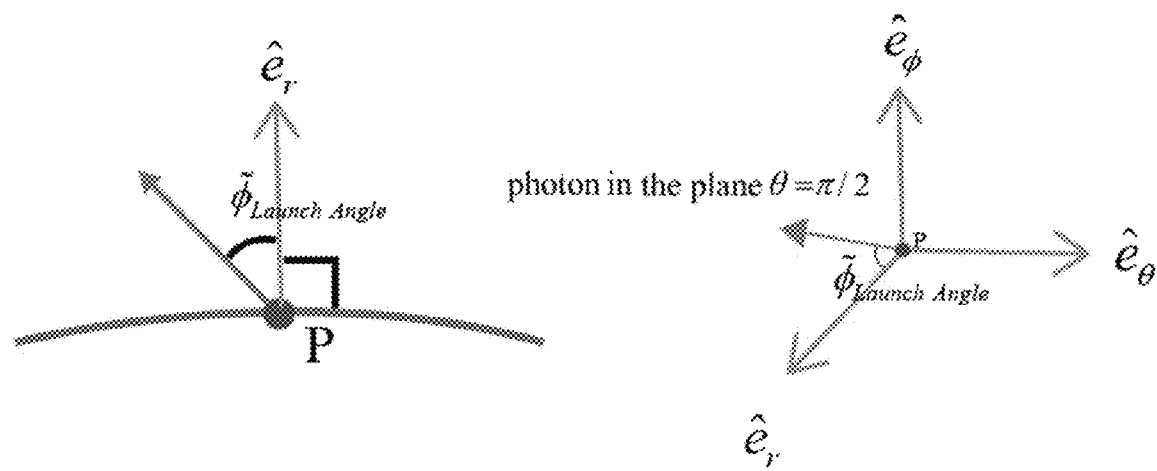

In this work, we consider an Earth-satellite system depicted in FIG. 1A to FIG. 1C. The FIG. 1A shows the Earth-Satellite system and corresponding coordinates; A photon is sent along its geodesic, which represented by a red line, and its polarization, represented by light-green arrows, measured in the local frame of a satellite. To compare the polarizations measured at the surface of Earth and the satellite, we introduce the standard frame in which a wave vector of the photon is aligned to the third axis of observer's local frames (FIG. 1B and FIG. 1C). We consider following four cases: a stationary observer, a radially free-falling observer, a free-falling observer with non-zero angular momentum in a circular, and spiraling orbit (FIG. 2A). We note the Wigner rotation has zero angle in special relativity if the direction of boost and a wave vector both lie in the $\hat{x}$-$\hat{z}$ plane, or the $\hat{y}$-$\hat{z}$ plane. However, if a photon moves in the $\hat{x}$-$\hat{z}$ plane and an observer in the $\hat{x}$-$\hat{y}$ plane, WRA is not necessarily zero. Correspondingly, by the equivalence principle, all the observer is assumed to move in the plane $\hat{e}_r$-$\hat{e}_\theta$, i.e., the constant-φ plane while the photon's geodesic remains in the equatorial plane (FIG. 2B). FIGS. 2A and 2B show schematics of the trajectory of the observer (satellite) and photon. The geodesics of a photon traveling lies in the constant φ-plane and the observers geodesics is lying in the equitorial plane, θ=π/2. In FIGS. 2A, A, B, and C represents the geodesics of massive free-falling observers radially, in a circular orbit, and spiraling orbit, respectively. FIG. 2B shows the launching angle of a photon.

We use Schwarzschild metric to model spacetime around Earth and choose spacelike components of the tetrads so that the first, second, and third axis of the local frames become unit vectors of Schwarzschild coordinates r, θ, and φ at infinity, i.e., $\hat{e}_{\hat{a}}{}^{\mu}(x_{\infty}) = \hat{e}_{b}{}^{\mu}$, where â=1, 2, and 3 correspond to b=r, θ, and φ, respectively. To define non-spinning local frames, we apply Fermi-walker transport and parallel transport conditions for the stationary and free falling observers respectively. Detailed works are given in the supplementary material. It is worth to mention that, when we set the local frame based on Schwarzschild coordinates, the rotation induced by the definition of polar coordinates has to be canceled out. In other words, since the unit vector of the coordinate r, $\hat{e}_r$, is rotated as a coordinate φ changes, we choose φ-axis as the third axies of local frames to cancel out the rotation when a wave vector is aligned to φ-axis for polarization comparison. Timelike components of the corresponding tetrads, $\hat{e}_t{}^{\mu}$, are set to the 4-velocity vector of a massive particle (e.g. satellite), moving along a geodesic corresponding to each case, to describe a local frame of the observer. The 4-velocity vectors of the observers and a wave vector of the photon are obtained in terms of conserved quantities defined from killing vectors of Schwarzschild spacetime (SI #). We set conserved energy, $\varepsilon_{photon}$, of a photon to its frequency to satisfy equivalence principle and the energy per unit mass, $\varepsilon_{obs}$, of an observer to one in the unit where h=G=c=1 since $\varepsilon_{obs}=(1-r_s/r)dt/d\tau$; 1. Detailed works are given in the Supplementary Information (SI). We choose a launching angle of the photon as 45° (FIG. 2-(b)) and an angular momentum per unit mass of the observers as $0.4\sqrt{r_s r_{earth}}$ so that the radial and polar components of the 4-velocity vectors have the same value in Schwarzschild coordinate, $\hat{e}_{\hat{0}}{}^r(x) = \hat{e}_{\hat{0}}{}^{\theta}(x)$, where $r_{earth}$ is the radius of Earth and $r_s$ is the Schwarzschild radius.

Results

On observation of Eq. (8), it is noted that if every parameter is real, then the result of this equation is always real. In other words, the result of Eq. (8) must be unity to avoid the imaginary Wigner angle. Accordingly, the first and second cases have zero WRAs since all the parameters are real. In the case that every parameter is not real, infinitesimal Winger rotation angle (IWA) is given by $$\tilde{\psi} = 2 \operatorname{Im}(\tilde{\alpha}) + \frac{2n^1}{1+n^3}\operatorname{Im}(\tilde{\beta}) + \frac{2n^2}{1+n^3}\operatorname{Im}(\tilde{\gamma}), \tag{9.}$$

which corresponds to the last two cases, free falling observers with angular momentum. We note that IWA consists of a classical rotation around the third axis, 2Im(α̃), and a quantum rotation induced by the Wigner's little group elements, $$\frac{2n^1}{1+n^3}\operatorname{Im}(\tilde{\beta}) + \frac{2n^2}{1+n^3}\operatorname{Im}(\tilde{\gamma}).$$

Figure 3:
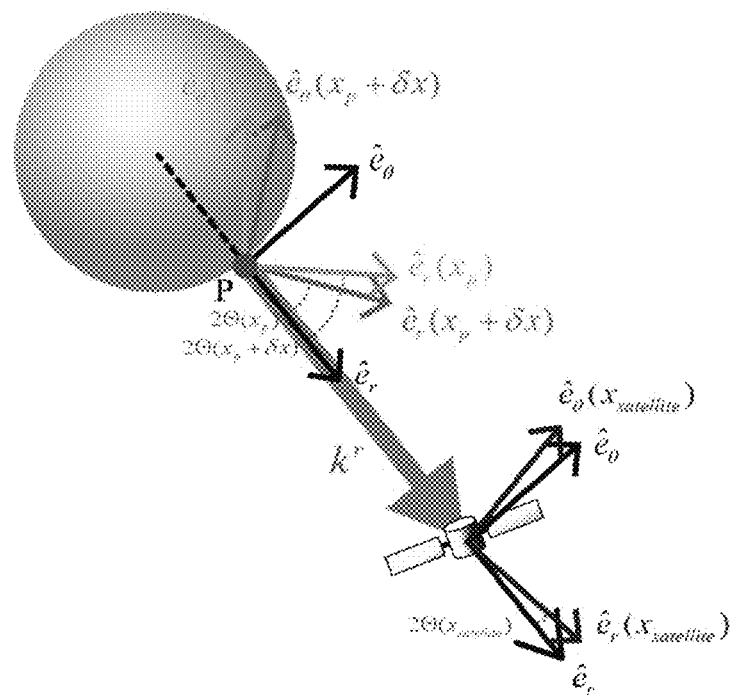
FIG. 3 shows the conceptual picture to interpret the tetrads for free falling observer with non-zero angular momentum.

For the circular-orbit case, parallel transport compensates the rotation induced by spherical coordinates such that spacelike components of the tetrads are rotated by θ when observer moves by −rθ, leading to small classical WRA. For the spiraling-orbit case, parallel-transport rotates the tetrads around the local third-axis by 2Θ(r), which is defined as $$\sin \Theta(r) \cong -\frac{l_{obs}}{\sqrt{rr_s}}\sqrt{1-\frac{r_s}{r}}, \quad (10.)$$

where $l_{obs}$ represents angular momentum per unit mass of an observer. In FIG. 3, we show the conceptual picture to interpret the classical IWA for the case of spiraling orbit. Since the leading term of classical IWA depends on only the radial component of wave vector, see SI, the system can be simplified by neglecting the angular momentum of a photon; The tetrads are rotated around $\hat{e}_\phi$ by the gravity and becomes asymptotically identical to the Schwarzschild coordinate as the photon is observed away from Earth. Accordingly, infinitesimal and total classical Wigner rotation is described by $\Theta(x+\delta x)-\Theta(x)$ and $\Theta(x_{satellite})-\Theta(x_{earth})$, respectively.

TABLE 1

Observer in Circular Orbit

| Altitude | Wigner angle (classical part + quantum part) | Classical part | Quantum part |
|---|---|---|---|
| 300 km | 2.42e−5 | −6.46e−14 | 2.42e−5 |
| 2000 km | 9.64e−5 | −3.03e−13 | 9.64e−5 |
| 20000 km | −8.77e−7 | −7.018e−13 | −8.77e−7 |
| 36000 km | −9.93e−5 | −7.61e−13 | −9.93e−5 |
| 1.6 × 10¹¹ km (r = ∞) | −6.25e−4 | −8.02e−13 | −6.25e−4 |

Observer in Spiraling Orbit

| Altitude | Wigner angle (classical part + quantum part) | Classical part | Classical part − Rotation of tetrad | Quantum part |
|---|---|---|---|---|
| 300 km | 1.13 | 1.16 | −1.36e−9 | 5.32e−6 |
| 2000 km | 6.30 | 6.31 | −7.71e−9 | 2.41e−6 |
| 20000 km | 24.48 | 24.48 | −2.25e−8 | −1.80e−4 |
| 36000 km | 29.31 | 29.31 | −2.40e−8 | −2.38e−4 |
| 1.6 × 10¹¹ km (r = ∞) | 47.15 | 47.15 | −9.15e−3 | −3.54e−4 |

Figure 4A:
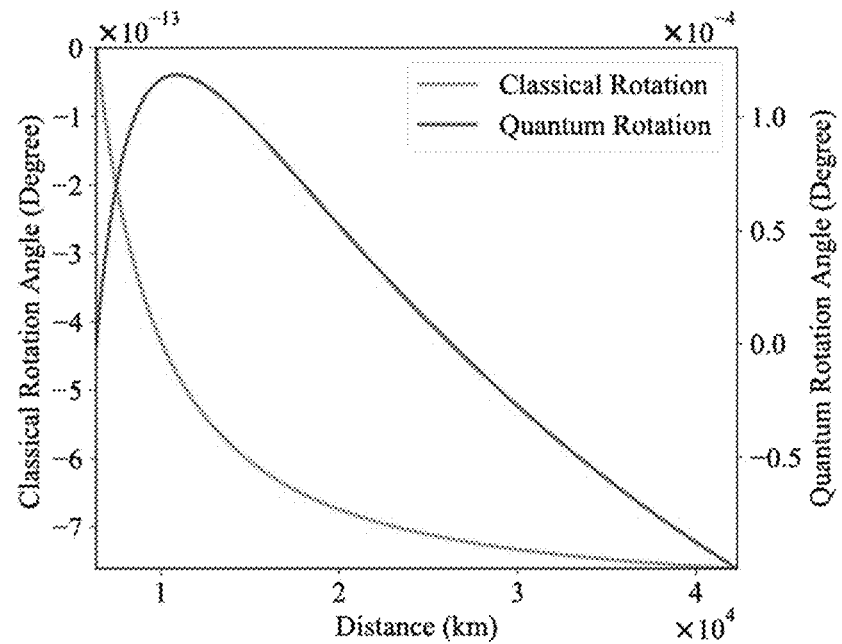
FIGS. 4A and 4B show the classical part in orange solid line, the quantum part in blue solid line, and total WRA in green line for the circular orbit.
Figure 4B:
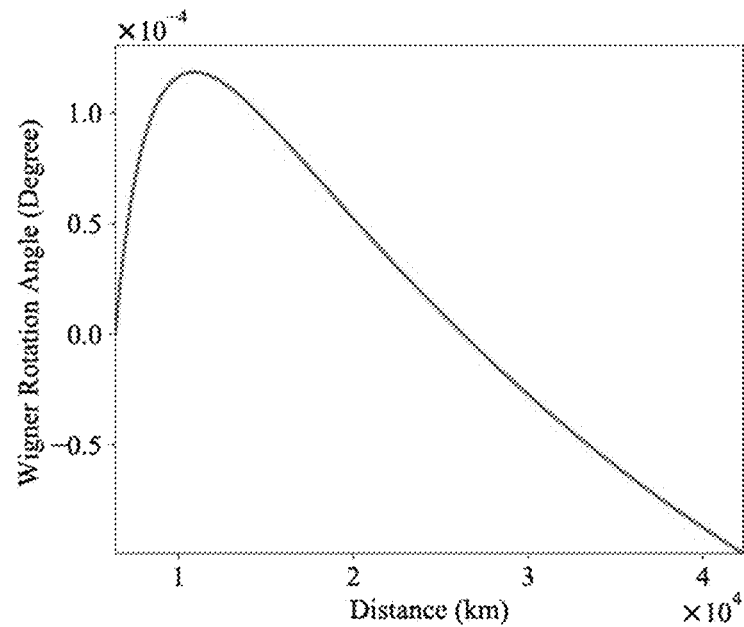
Figure 4C:
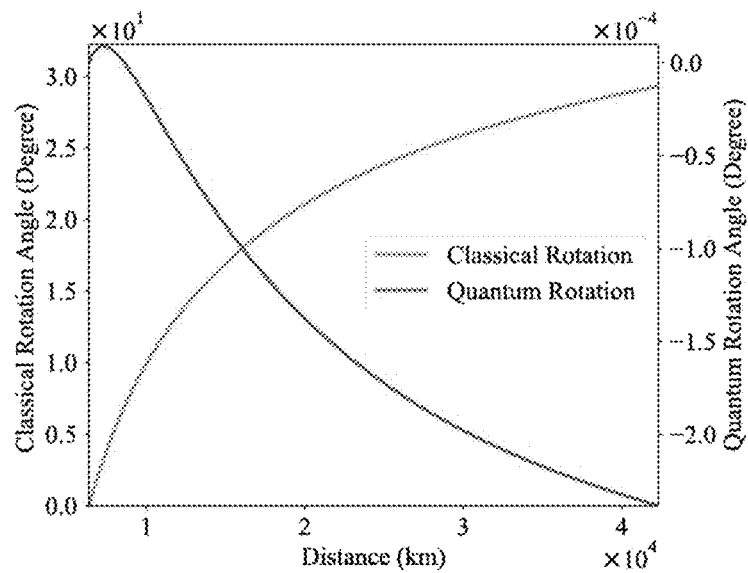
FIGS. 4C and 4D show the classical part in orange solid line, the quantum part in blue solid line, and total WRA in green line for the spiraling orbit.
Figure 4D:
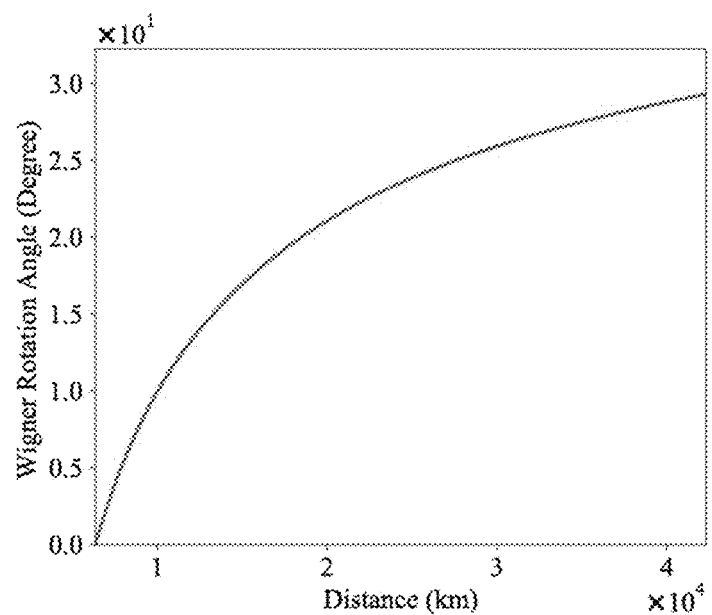
Figure 5:
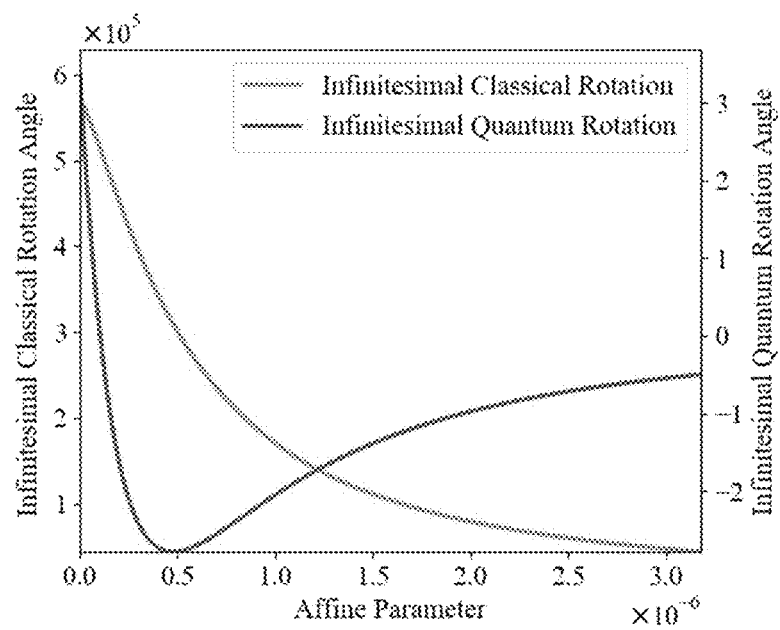
FIG. 5 shows the relationship between the infinite classical rotation and quantum rotation versus affine parameters of a free-fall observer with non-zero angular momentum for a circular orbit.

In Table 1, the rotation angles of the tetrads, classical part of IWA (general relativistic effect), $2\text{Im}(\tilde{\alpha})$, and the quantum rotation, $$\frac{2n^1}{1+n^3}\text{Im}(\hat{\beta}) + \frac{2n^2}{1+n^3}\text{Im}(\tilde{\gamma}),$$

are compared for circular and spiraling orbits by integrating them from the surface of Earth to the altitudes of various Earth orbits. It is confirmed that $2\text{Im}(\tilde{a})$ represents the classical rotation by the almost identical two angles, $2\Theta(r)$ and $2\text{Im}(\tilde{\alpha})$. Furthermore, it is shown that the circular orbit has much lesser classical angle compared to spiraling case, as mentioned above. FIGS. 4A and 4B show total WRA for the circular case. The classical part (general relativistic rotation) and the quantum part is represented by orange solid line and blue solid line, respectively. The total WRA is shown in FIG. 4B. FIGS. 4C and 4D corresponds to the spiraling case. Likewise, the classical and quantum part is shown in FIG. 4C and FIG. 4D shows total WRA. For standard BB84 protocol, this corresponds to QBER (Quantum Bit Error Rate) of 1.21% in the case of the LEO and 17.2% in the case of the MEO. This is consistent with a recent analysis, showing that a near-Earth-to-space QKD systems rely on entanglement distribution of photon states could have an additional contribution to its QBER as high as 0.7% because of spacetime curvature, and these effects are observable with current technologies.

Conclusion and Discussion

In this work, we studied the Wigner rotation of a photon state in Schwarzschild spacetime to study a rotation of the polarization. The gravitational field of Earth is described by the Schwarzschild metric.[16] We calculated the wave vector of the photon to get infinitesimal local Lorentz transformations for the four cases of a stationary observer, free falling observer with zero angular momentum, and free falling observer with angular momentum in a circular and spiraling orbit. For the first two cases, the calculated Wigner angles are zeros. We calculate the non-zero Wigner angles for the last two cases in two different ways: (1) by using approximations and (2) interpolation methods for verification of our results since a differential equation for the photon's trajectory is challenging to solve analytically and the tetrads of spiraling orbits have too complex forms to find physical meanings of them. It is found that two different approaches give the same result up to 16 significant figures. The circular case results in non-zero WRA but its orders is only about $10^{-5}$ at NEO and LEO. For the spiraling case, quantum parts of WRA are $5.32\times10^{-6\circ}$ at NEO and $-3.54\times10^{-4\circ}$ at infinity. These results are significantly larger than previous classical estimations. Furthermore, the total Wigner rotations have angles of 1.13504° at NEO and 47.1469° at infinity and expected to contribute QBER 1.21 and 17.2% to the quantum bit error rate in the case of LEO and MEO, respectively. It is also interesting to compare these results with the works by Connors et al., who estimated the polarization rotation angle of 82° at infinity from the X-rays near black hole in Cygnus X−1 by using the general relativistic calculations. We believe our work would pave the road to test the gravitational effects on the quantum system.

Supplementary Material for Energy of Photon with the Affine Parameter Used in this Specification (SI)

In general relativity, it is well known that the Lagrangian, L, can be chosen in the form (1)

$$\frac{1}{2}\left(\frac{ds}{d\xi}\right)^2 \quad (S1)$$

with the line element for the Schwarzschild metric, which is defined as follows $$ds^2 = -\left(1-\frac{r_s}{r}\right)dt^2 + \left(1-\frac{r_s}{r}\right)^{-1}dr^2 + r^2 d\theta^2 + r^2 \sin^2\theta d\phi^2. \quad (S2)$$

If the Lagrangian has no dependence on specific coordinates ($x^\mu$), the equations of motion imply the conservation of some quantities. Specifically, the equations of motion are written below as $$\frac{d}{d\tau}\left(\frac{\partial L}{\partial (dx^\mu/d\xi)}\right) = \frac{dL}{dx^\mu} = 0. \tag{S3}$$

From the above equation, the following identities hold, such as $$\frac{\partial L}{\partial (dx^\mu/d\xi)} = \tag{S4}$$

$$g_{\mu\beta}\frac{dx^\beta}{d\xi} = g_{\alpha\beta}\delta_\mu^\alpha \frac{dx^\beta}{d\xi} = g_{\mu\beta}\frac{\partial x^\alpha}{\partial x^\mu}\frac{dx^\beta}{d\xi} = \frac{\partial}{\partial x^\mu}\cdot\frac{dx}{d\xi} = const.$$

In Schwarzschild spacetime, the time and azimuthal components of wave vector, $k^t$, $k^\phi$, are constant, since time t, and azimuthal angle, $\phi$, are cyclic coordinates in the metric. Therefore, from equation (S4), following two conserved quantities e and l are defined as (1)

$$e \equiv -\frac{\partial}{\partial t}\cdot\frac{dx}{d\xi} = \left(1-\frac{r_s}{r}\right)\frac{dt}{d\xi}, \quad l \equiv -\frac{\partial}{\partial \phi}\cdot\frac{dx}{d\xi} = r^2 \sin^2\theta \frac{d\phi}{d\xi}. \tag{S5}$$

Here, these two conserved quantities are called energy per unit rest mass e at very large r, the distance from the origin and angular momentum per unit rest mass at very low velocities, l, respectively. For brevity, we call 'e' the energy and 'l' the angular momentum in this paper. For a photon, the geodesic equation in the Schwarzschild metric can be rewritten as $$-\frac{e_{ph}^2}{\left(1-\frac{r_s}{r}\right)} + \frac{1}{\left(1-\frac{r_s}{r}\right)}\left(\frac{dr}{d\xi}\right)^2 + \frac{l_{ph}}{r^2} = 0, \tag{S6}$$

$$\left(\frac{dr}{d\xi}\right)^2 = -\sqrt{e_{ph}^2 - \frac{l_{ph}}{r^2}\left(1-\frac{r_s}{r}\right)} = -e_{ph}\sqrt{1 - \frac{b_{ph}^2}{r^2}\left(1-\frac{r_s}{r}\right)}, \tag{S7}$$

since all of the wave vectors of massless particles are null vectors. In other words, we can get the explicit form of wave vectors and corresponding dual vectors:

$$k^\mu(x) = \left(\frac{e_{ph}}{1-\frac{r_s}{r}}, -e_{ph}\sqrt{1-\frac{b_{ph}^2}{r^2}\left(1-\frac{r_s}{r}\right)}, \frac{e_{ph}b_{ph}}{r^2}, 0\right) \tag{S8}$$

$$k_\mu(x) = \left(-e_{ph}, -\frac{e_{ph}}{1-\frac{r_s}{r}}\sqrt{1-\frac{b_{ph}^2}{r^2}\left(1-\frac{r_s}{r}\right)}, e_{ph}b_{ph}, 0\right) \tag{S9}$$

By the Equivalence principle, wave vectors in the local inertial frame, which is defined with radially free falling tetrads, should have the same form with wave vectors in flat spacetime, which is as follows $$k_{\hat{a}}(x) = (-\omega, k_1, k_2, k_3) \text{ where } \omega = \sqrt{(k_{\hat{1}})^2 + (k_{\hat{2}})^2 + (k_{\hat{3}})^2} \tag{S10}$$

In other words, inner product of wave vector with the time component of tetrads should be the same as the angular frequency of a photon in flat spacetime, $$k_{\hat{0}}(x) = -\frac{e_{ph}}{1-\frac{r_s}{r}}\left(1 - \sqrt{\frac{r_s}{r}}\sqrt{1-\frac{b_{ph}^2}{r^2}\left(1-\frac{r_s}{r}\right)}\right) \cong \tag{s1}$$

$$-e_{ph}\left(1 + \frac{r_s}{r} - \sqrt{\frac{r_s}{r}}\sqrt{1-\frac{b_{ph}^2}{r^2}\left(1-\frac{r_s}{r}\right)}\right) = -\omega.$$

Therefore, we conclude that photon's energy is the same as the frequency of the photon, measured at the $r=\infty$.

Parameter Dependences of the Wigner Rotation

A Hermitian matrix K, corresponding to each wave vector k of the photon, is defined as (2, 3)

$$K = \sigma_a k^a \tag{S12}$$

where $\sigma_0$ is the 2×2 Identity matrix, and $\sigma_i$ (i=1, 2, 3) are the Pauli matrices. Therefore, K has the form (2,3)

$$K = k^0 \begin{pmatrix} n^3 & n^1 - in^2 \\ n^1 + in^2 & n^3 \end{pmatrix} \tag{S13}$$

where $$n^i = \frac{k^i}{k^0} \quad (i = 1, 2, 3).$$

Then, there is a matrix A in SL(2, C) for any Lorentz transformation such that $$K' = \Lambda^a{}_b k^b \sigma_a = AKA^\dagger \tag{S14}$$

Since A is the elements of SL(2, C), it can be represented as $$A = \begin{pmatrix} \alpha & \beta \\ \gamma & \delta \end{pmatrix} \tag{S15}$$

with unit determinant, i.e., $\alpha\delta - \gamma\beta = 1$. For the Wigner's little group element (2-4) $W(\Lambda,k) = L_{\Lambda k}^{-1} \Lambda L_k$, we can define a matrix corresponding matrix $S(\Lambda,k)$ in SL(2, C) such that $W(\Lambda,k) = \Lambda(S(\Lambda,k))$ and $$S(\Lambda,k) = A_{\Lambda k}^{-1} A A_k \tag{S16}$$

where $A_k$ corresponds to L(k) that $\tilde{k}$ is transformed into k. Here, $\tilde{k} = (1,0,0,1)$ $A_k$ has the form $$A_k = \frac{1}{\sqrt{2k^0(1+n^3)}}\begin{pmatrix} k^0(1+n^3) & -n_- \\ k^0 n_+ & 1+n^3 \end{pmatrix}. \tag{S17}$$

If K' is written by $$K' = k'^0 \begin{pmatrix} 1+n'^3 & n'_- \\ n'_+ & 1-n'^3 \end{pmatrix} = AKA^\dagger = k^0\begin{pmatrix} b & c^* \\ c & a-b \end{pmatrix} \tag{S18}$$

where $$A = \begin{pmatrix} \alpha & \beta \\ \gamma & \delta \end{pmatrix} \in SL(2, C),$$

then we get the following relations after some mathematical manipulations $$a = (|\alpha|^2, |\gamma|^2)(1+n^3) + \qquad (S19)$$
$$(|\beta|^2 + |\delta|^2)(1-n^3) + (\alpha\beta^* + \gamma\delta^*)n_- + (\alpha^*\beta + \gamma^*\delta)n_+$$

$$b = |\alpha|^2(1+n^3) + |\beta|^2(1-n^3) + \alpha\beta^* n_- + \alpha^*\beta n_+ \qquad (S20)$$

$$c = \alpha^*\gamma(1+n^3) + \beta^*\delta(1-n^3) + \beta^*\gamma n_- + \alpha^*\delta n_+ \qquad (S21)$$

$$k'^0 = \frac{a}{2}k^0, \; n'^3 = \frac{2b}{a} - 1, \; n'_+ = \frac{2c}{a}. \qquad (S22)$$

Then $S(\Lambda,k)$ has the form $$S = \begin{pmatrix} e^{i\psi/2} & z \\ 0 & e^{-i\psi/2} \end{pmatrix}, \psi \in [0, 4\pi] \qquad (S23)$$

by direct calculation. Here, z is an arbitrary complex number. Substituting the equation (S20), in terms of a, b, $\alpha$, $\beta$, $\gamma$, $\delta$, into the equation (S18) we get the relation (2)

$$e^{i(\psi(\Lambda,k)/2)} = \frac{[\alpha(1+n^3)+\beta n_+]b + [\gamma(1+n^3)+\delta n_+]c^*}{a\sqrt{b(1+n^3)}}. \qquad (S24)$$

Moreover, the matrix S can be rewritten in the form $$S = \begin{pmatrix} e^{i\psi/2} & e^{-i\psi/2}z \\ 0 & e^{-i\psi/2} \end{pmatrix}, \psi \in [0, 4\pi] \qquad (S25)$$

The product of any two elements in this group becomes $$S_1 S_2 = \begin{pmatrix} e^{i(\psi_1+\psi_2)/2} & e^{-i(\psi_1+\psi_2)/2}(z_1 + e^{i\psi_1}z_2) \\ 0 & e^{-i(\psi_1+\psi_2)/2} \end{pmatrix}, \psi \in [0, 4\pi]. \qquad (S26)$$

In other words, we have the following composition law such that $$(z_1,\psi_1)(z_2,\psi_2)=(z_1+\exp(i\psi_1)z_2,\psi_1+\psi_2). \qquad (S27)$$

Thus, this group is the E(2) group.

There are two classes of the irreducible unitary representations of the E(2). One is the infinitesimal dimension representations and the other is the one-dimension representations. However, the former has intrinsic continuous degrees of freedom. Therefore, the Lorentz transformation for the photon has the one-dimension representations, since the photon is not observed to have any continuous degrees of freedom. The representations have the form (4)

$$U(\Lambda)|k,\sigma\rangle = e^{i\sigma\psi(\Lambda,k)}|\Lambda k,\sigma\rangle. \qquad (S28)$$

Here, $\psi(\Lambda,k)$ is the Wigner angle. When equation (S26) is expanded to the first order of $d\xi$ in the form $$e^{i\psi(\Lambda,k)/2} \sim 1 + i\tilde{\psi}(\Lambda, k)\frac{d\xi}{2}, \qquad (S29)$$

the finite Wigner rotations can be built up as a time ordered integration of infinitesimal Wigner rotations over the geodesic trajectory $x(\xi)$ of the photon via $$e^{i\psi(\Lambda,\vec{n})/2} = T \exp\left[i\int \tilde{\psi}(\Lambda(\xi),\vec{n}(\xi))\frac{d\xi}{2}\right] \qquad (S30)$$

where $\vec{n}(\xi)=\vec{n}(x(\xi))$, $\Lambda^\mu{}_\nu(\xi)=\Lambda^\mu{}_\nu(x(\xi))$ and T is the time order operator. If the homogeneous Lorentz transformation is expressed as $\Lambda^a{}_b=\delta^a{}_b+\omega^a{}_b$, the Wigner angle is related to $\omega^\mu{}_\nu$. To see this, we expand A in terms of $d\xi$ as $$A = \begin{pmatrix} \alpha & \beta \\ \gamma & \delta \end{pmatrix} = I + \tilde{A}d\xi = I + \begin{pmatrix} \tilde{\alpha} & \tilde{\beta} \\ \tilde{\gamma} & \tilde{\delta} \end{pmatrix} d\xi. \qquad (S31)$$

By the condition that the A has unit determinant, $\tilde{\delta}=-\tilde{\alpha}$. In other words, the A is expanded in the form $$A = \begin{pmatrix} \alpha & \beta \\ \gamma & \delta \end{pmatrix} = I + \tilde{A}d\xi = I + \begin{pmatrix} \tilde{\alpha} & \tilde{\beta} \\ \tilde{\gamma} & -\tilde{\alpha} \end{pmatrix} d\xi. \qquad (S32)$$

Substituting the equation (S32) into the equation (S19), multiplying $\sigma_a$ both sides, and then taking a trace on both sides, we can get the following equations by the relation $$tr(\sigma_a\sigma_b)=2\delta_{ab}$$

$$\omega^a{}_b = \tfrac{1}{2}\delta^{ac} tr(\sigma_b\sigma_c\tilde{A}+\sigma_c\sigma_b\tilde{A}^\dagger) \qquad (S33)$$

where tr(A) is the trace of A. From the equation (S33), we obtain $$\tilde{\alpha}=\tfrac{1}{2}(\omega^0{}_3+i\omega^1{}_2)$$

$$\tilde{\beta}=\tfrac{1}{2}[(\omega^0{}_1-\omega^3{}_1)+i(\omega^0{}_2+\omega^2{}_3)]$$

$$\tilde{\gamma}=\tfrac{1}{2}[(\omega^0{}_1-\omega^2{}_3)]. \qquad (S34)$$

Real Parameters

The $\alpha$, $\beta$, $\gamma$, $\delta$, $|\alpha|^2$, $|\beta|^2$, $|\gamma|^2$, $|\delta|^2$ have the following forms by the definition $$\alpha=1+\tilde{\alpha}d\xi,$$

$$\beta=\tilde{\beta}d\xi,$$

$$\gamma=\tilde{\gamma}d\xi,$$

$$|\alpha|^2=1+2\tilde{\alpha}d\xi,$$

$$|\beta|^2=0,$$

$$|\gamma|^2=0,$$

$$|\delta|^2=1-2\tilde{\alpha}d\xi. \qquad (S35)$$

Substituting $n_\pm = n^1$ into equations (S19), (S20) and (S21), we obtain $$a = 2 + 2(2\tilde{\alpha}n^3 + (\tilde{\beta} + \tilde{\gamma})n^1)d\xi, \quad (S36)$$

$$b = (1 + n^3) + 2(2\tilde{\alpha}(1 + n^3) + \tilde{\beta}n^1)d\xi, \quad (S37)$$

and $c = n^1 + (\tilde{\gamma}(1 + n^3) + \tilde{\beta}(1 - n^3))d\xi.$ (S38)

In this work, we have calculated to the first order of $d\xi$. Using these parameters, the numerator of equation (S25) has the form $$[\alpha(1+n^3) + \beta n_+]b + [\gamma(1+n^3) + dn_+]c^* = 2(1+n^3) + [2\tilde{\alpha} + 6\tilde{\alpha}n^3 + 4\tilde{\alpha}(n^3)^2 + 4\tilde{\beta}n^1 + 2\tilde{\beta}n^1n^3 + 2\tilde{\gamma}n^1 + 2\tilde{\gamma}n^1n^3]d\xi. \quad (S39)$$

We also have $$\frac{1}{a\sqrt{b(1+n^3)}} = \qquad (S40)$$

$$\frac{1}{2(1+n^3)} - \frac{2\tilde{\alpha}n^3 + \tilde{\beta}n^1 + \tilde{\gamma}n^1 + 2\tilde{\alpha} + 2\tilde{\beta}n^1(1+n^3)^{-1}}{2(1+n^3)}d\xi.$$

By direct calculations, one can show that equation (S29) becomes $$e^{i(\psi(\Lambda,k)/2)} = 1. \quad (S41)$$

Therefore, it is evident that the observer who is at rest and falling free with zero angular momentum sees no Wigner rotation.

Complex Parameters

In the case that every parameter is not real, $|\alpha|^2$, $|\beta|^2$, $|\gamma|^2$, $|\delta|^2$, have the form $$|\alpha|^2 = 1 + 2\mathrm{Re}(\tilde{\alpha})d\xi$$

$$|\beta|^2 = 0$$

$$|\gamma|^2 = 0$$

$$|\delta|^2 = 1 - 2\mathrm{Re}(\tilde{\alpha})d\xi \qquad (S42)$$

where $\mathrm{Re}(\tilde{\alpha})$ is the real part of the complex number $\tilde{\alpha}$. Equations (S19), (S20), and (S21) are then rewritten $$\begin{aligned} a &= (|\alpha|^2 + |\gamma|^2)(1+n^3) + (|\beta|^2 + |\delta|^2)(1-n^3) + \\ &\quad (\alpha\beta^* + \gamma\delta^*)n_- + (\alpha^*\beta + \gamma^*\delta)n_+ \\ &= 2 + \left[4n^3\ \mathrm{Re}(\tilde{\alpha}) + 2\ \mathrm{Re}(\tilde{\beta}n_+ + \tilde{\gamma}n_-)\right]d\xi \end{aligned} \quad (S43)$$

$$\begin{aligned} b &= |\alpha|^2(1+n^3) + |\beta|^2(1-n^3) + \alpha\beta^*n_- + \alpha^*\beta n_+, \\ &= (1 + 2\ \mathrm{Re}(\tilde{\alpha})d\xi)(1+n^3) + 2\ \mathrm{Re}(\tilde{\beta}n_+)d\xi \\ &= (1+n^3) + \left[2\ \mathrm{Re}(\tilde{\alpha})(1+n^3) + 2\ \mathrm{Re}(\tilde{\beta}n_+)\right]d\xi \end{aligned} \quad (S44)$$

and $$\begin{aligned} c &= \alpha^*\gamma(1+n^3) + \beta^*\delta(1-n^3) + \beta^*\gamma n_- + \alpha^*\delta n_+ \\ &= \tilde{\gamma}(1+n^3)d\xi + \tilde{\beta}^*(1-n^3)d\xi + (1 + \tilde{\alpha}^*d\xi)(1 - \tilde{\alpha}d\eta)n_+ \\ &= n_+ + \left[\tilde{\gamma}(1+n^3) + \tilde{\beta}^*(1-n^3) - 2in_+\ \mathrm{Im}(\tilde{\alpha})\right]d\xi \end{aligned} \quad (S45)$$

where $\mathrm{Im}(\tilde{\alpha})$ is the imaginary part of the complex number $\tilde{\alpha}$. From above equations, we obtain $$\begin{aligned} [\alpha(1+n^3) + \beta n_+]b + [\gamma(1+n^3) + \delta n_+]c^* &= \left((1+n^3) + [\tilde{\alpha}(1+n^3) + \tilde{\beta}n_+]d\xi\right)(1+n^3) + [2\ \mathrm{Re}(\tilde{\alpha})(1+n^3) + \\ &\quad 2\ \mathrm{Re}(\tilde{\beta}n_+)]d\xi) + (n_+ + [\tilde{\gamma}(1+n^3) - \tilde{\alpha}n_+]d\xi)(n_- + [\tilde{\gamma}^*(1+n^3) + \\ &\quad \tilde{\beta}(1-n^3) + 2in_-\ \mathrm{Im}(\tilde{\alpha})]d\xi) \\ &= (1+n^3)^2 + n_+n_- + \left[\tilde{\alpha}(1+n^3)^2 + \tilde{\beta}n_+(1+n^3) + 2\ \mathrm{Re}(\tilde{\alpha})(1+n^3)^2 + \right. \\ &\quad 2\ \mathrm{Re}(\tilde{\beta}n_+)(1+n^3) - \tilde{\alpha}n_+n_- + 2\ \mathrm{Re}(\tilde{\gamma}^*n_+)(1+n^3) + \\ &\quad \left. \tilde{\beta}n_+(1-n^3) + 2in_+n_-\ \mathrm{Im}(\tilde{\alpha})\right]d\xi \\ &= 2(1+n^3) + \left[2\tilde{\alpha}n^3(1+n^3) + 2\tilde{\beta}n_+ + 2\ \mathrm{Re}(\tilde{\alpha})(1+n^3)^2 + 2\ \mathrm{Re}(\tilde{\beta}n_+)(1+n^3) + \right. \\ &\quad \left. \mathrm{Re}(\tilde{\gamma}^*n_+)(1+n^3) + 2in_+n_-\ \mathrm{Im}(\tilde{\alpha})\right]d\xi \\ &= 2(1+n^3)\left(1 + \left[\frac{2\tilde{\alpha}n^3(1+n^3) + 2\tilde{\beta}n_+ + 2\ \mathrm{Re}(\tilde{\alpha})(1+n^3)^2 + }{2\ \mathrm{Re}(\tilde{\beta}n_+)(1+n^3) + \mathrm{Re}(\tilde{\gamma}^*n_+)(1+n^3) + 2in_+n_-\ \mathrm{Im}(\tilde{\alpha})}}{2(1+n^3)}\right]d\xi\right) \end{aligned} \quad (S46)$$

and $$\begin{aligned} \frac{1}{a\sqrt{b(1+n^3)}} &= \frac{1}{(2 + [4n^3\ \mathrm{Re}(\tilde{\alpha}) + 2\ \mathrm{Re}(\tilde{\beta}n_+ + \tilde{\gamma}n_-)]d\xi)\sqrt{(1+n^3)^2 + [2\ \mathrm{Re}(\tilde{\alpha})(1+n^3)^2 + 2\ \mathrm{Re}(\tilde{\beta}n_+)(1+n^3)]d\xi}} \\ &= \frac{1}{2}\left(1 - \frac{[4n^3\ \mathrm{Re}(\tilde{\alpha}) + 2\ \mathrm{Re}(\tilde{\beta}n_+ + \tilde{\gamma}n_-)]}{2}d\xi\right)\frac{1}{(1+n^3)}\frac{1}{\sqrt{1 + \frac{[2\ \mathrm{Re}(\tilde{\alpha})(1+n^3) + 2\ \mathrm{Re}(\tilde{\beta}n_+)]d\xi}{(1+n^3)}}} \\ &= \frac{1}{2(1+n^3)}\left(1 - \frac{[4n^3\ \mathrm{Re}(\tilde{\alpha})(1+n^3) + 2\ \mathrm{Re}(\tilde{\beta}n_+ + \tilde{\gamma}n_-)(1+n^3)]}{2(1+n^3)}d\xi\right)\left(1 - \frac{[2\ \mathrm{Re}(\tilde{\alpha})(1+n^3) + 2\ \mathrm{Re}(\tilde{\beta}n_+)]}{2(1+n^3)}d\xi\right) \end{aligned} \quad (S47)$$

In the previous section, we proved real components of the parameters lead Eq. (S41) to one.
Substituting these results into (S41), we have the form $$e^{i(\psi(\Lambda,k)/2)} = \frac{[\alpha(1+n^{\hat{3}})+\beta n_+]b + [\gamma(1+n^{\hat{3}})+\delta n_+]c^*}{a\sqrt{b(1+n^{\hat{3}})}} \quad (S48)$$

$$= \left(1 - \frac{[4n^{\hat{3}} \operatorname{Re}(\tilde{\alpha})(1+n^{\hat{3}}) + 2 \operatorname{Re}(\tilde{\beta}n_+ + \tilde{\gamma}n_-)(1+n^{\hat{3}})]}{2(1+n^{\hat{3}})} d\xi\right)\left(1 - \frac{[2 \operatorname{Re}(\tilde{\alpha})(1+n^{\hat{3}}) + 2 \operatorname{Re}(\tilde{\beta}n_+)]}{2(1+n^{\hat{3}})} d\xi\right)$$

$$\left(1 + \left[\frac{2\tilde{\alpha}n^{\hat{3}}(1+n^{\hat{3}}) + 2\tilde{\beta}n_+ + 2 \operatorname{Re}(\tilde{\alpha})(1+n^{\hat{3}})^2 + 2 \operatorname{Re}(\tilde{\beta}n_+)(1+n^{\hat{3}}) + \operatorname{Re}(\tilde{\gamma}^*n_+)(1+n^{\hat{3}}) + 2in_+n_- \operatorname{Im}(\tilde{\alpha})}{2(1+n^{\hat{3}})}\right] d\xi\right)$$

$$= 1 + \frac{1}{2(1+n^{\hat{3}})}\left[-4n^{\hat{3}} \operatorname{Re}(\tilde{\alpha})(1+n^{\hat{3}}) - 2 \operatorname{Re}(\tilde{\beta}n_+ + \tilde{\gamma}n_-)(1+n^{\hat{3}}) - 2 \operatorname{Re}(\tilde{\alpha})(1+n^{\hat{3}}) - 2 \operatorname{Re}(\tilde{\beta}n_+) + \right.$$

$$2\tilde{\alpha}n^{\hat{3}}(1+n^{\hat{3}}) + 2\tilde{\beta}n_+ + 2 \operatorname{Re}(\tilde{\alpha})(1+n^{\hat{3}})^2 + 2 \operatorname{Re}(\tilde{\beta}n_+)(1+n^{\hat{3}}) + \operatorname{Re}(\tilde{\gamma}n_+)(1+n^{\hat{3}}) + 2in_+n_- \operatorname{Im}(\tilde{\alpha})\right]d\xi$$

$$= 1 + \frac{1}{2(1+n^{\hat{3}})}\left[-2 \operatorname{Re}(\tilde{\beta}n_+ + \tilde{\gamma}n_-)(1+n^{\hat{3}}) - 2 \operatorname{Re}(\tilde{\beta}n_+) + \right.$$

$$\left. 2\tilde{\beta}n_+ + 2 \operatorname{Re}(\tilde{\beta}n_+)(1+n^{\hat{3}}) + \operatorname{Re}(\tilde{\gamma}^*n_+)(1+n^{\hat{3}}) + 2i(1+n^{\hat{3}}) \operatorname{Im}(\tilde{\alpha})\right]d\xi$$

Therefore, we can conclude Eq. (S47) has the form $$\frac{1}{a\sqrt{b(1+n^{\hat{3}})}}[\alpha(1+n^{\hat{3}})+\beta n_+]b + [\gamma(1+n^{\hat{3}})+dn_+]c^* = \quad (S49)$$

$$1 + i\left[\operatorname{Re}(\tilde{\beta})\frac{n^{\hat{2}}}{1+n^{\hat{3}}} + \operatorname{Im}(\tilde{\beta})\frac{n^{\hat{1}}}{1+n^{\hat{3}}} + \operatorname{Im}(\tilde{\alpha})\right]d\xi.$$

By the definition, the infinitesimal Wigner angle is $$\tilde{\psi} = 2 \operatorname{Im}(\tilde{\alpha}) + \frac{2n^{\hat{1}}}{1+n^{\hat{3}}} \operatorname{Im}(\tilde{\beta}) + \frac{2n^{\hat{2}}}{1+n^{\hat{3}}} \operatorname{Im}(\tilde{\gamma}) \quad (S50)$$

Tetrads for Stationary Observer
The tetrads, $e_a{}^\mu(x)$, are defined as (5, 6)

$$g_{\mu\nu}(x)e_a{}^\mu(x)\cdot e_b{}^\nu(x)=\eta_{ab}. \quad (S51)$$

For a stationary observer (Bob), his local frame is defined mathematically with the following tetrads in Schwarzschild spacetime, $$(e_0)^\mu(x)=(e_t)^\mu(x)=(1/(1-r_s/r)^{1/2},0,0,0)$$

$$(e_1)^\mu(x)=(e_r)^\mu(x)=(0,(1-r_s/r)^{1/2},0,0)$$

$$(e_2)^\mu(x)=(e_\theta)^\mu(x)=(0,0,1/r,0)$$

$$(e_3)^\mu(x)=(e_\phi)^\mu(x)=(0,0,0,1/r). \quad (S52)$$

This tetrad represents a static local inertial frame at each point, since all the components are independent of time and spatial components of the timelike tetrad, $e_i{}^t(x)$ where i=1, 2, 3, and the time components of spacelike tetrads, $e_0{}^\alpha$)

where $\alpha=r$, $\theta$, $\varphi$, are zero. The corresponding ILLT (Infinitesimal Local Lorentz Transformation) matrix is given by $$\omega_b{}^a = \begin{pmatrix} 0 & -\frac{k^t r_s}{2r^2} & 0 & 0 \\ -\frac{k^t r_s}{2r^2} & 0 & -k^\theta\left(1-\frac{r_s}{r}\right)^{1/2} & 0 \\ 0 & k^\theta\left(1-\frac{r_s}{r}\right)^{1/2} & 0 & 0 \\ 0 & 0 & 0 & 0 \end{pmatrix}. \quad (S53)$$

It is easy to see all the parameters, defined in Eq. (S34), are real with this ILLT matrix.

Therefore, Bob at rest cannot observe non-zero Wigner rotation angle.

Tetrads for Free Falling Observer with Zero Angular Momentum

The observer starts from rest at infinity and fall radially inward. The observer's energy and angular momentum, defined in equation (S5), are 1 and 0, respectively. [Hartle] Thus, the timelike component of 4-velocity vector is $(1-r_s/r)^{-1}$ and the component of $\phi$-direction of 4-velocity vector is zero. The component of $\theta$-direction is also zero, since we assume that observer travels in the plane $\theta=\pi/2$ By substituting the component of t-direction into the following equation, $$-\left(1-\frac{r_s}{r}\right)\left(\frac{dt}{d\xi}\right)^2 + \left(1-\frac{r_s}{r}\right)^{-1}\left(\frac{dr}{d\xi}\right)^2 = -1, \quad (S54)$$

we can obtain the component of r-direction. In this case, the ILLT matrix is given by $$(\omega_b^a) = \begin{pmatrix} 0 & -\frac{k^t r_s}{2r^2} - \sqrt{\frac{r_s}{r}}\frac{k^r}{2r(1-\frac{r_s}{r})} & k^\theta \sqrt{\frac{r_s}{r}} & 0 \\ -\frac{k^t r_s}{2r^2} - \sqrt{\frac{r_s}{r}}\frac{k^r}{2r(1-\frac{r_s}{r})} & 0 & k^\theta & 0 \\ k^\theta \sqrt{\frac{r_s}{r}} & -k^\theta & 0 & 0 \\ 0 & 0 & 0 & 0 \end{pmatrix}.$$  (S55)

Tetrads for Free Falling Observers with Non-Zero Angular Momentum I (Spiral Orbit)

In this case, we also assume that e=1[Hartle]. The observer, who is falling free with angular momentum has the 4-velocity vector such that $$u(\tau) = (e_{\hat{t}})^\mu(x) = \left(1/(1 - r_s/r), u^r, 0, \frac{l}{r^2}\right)$$  (S56)

where $$u^r = -\left(\frac{r_s}{r} - \frac{l^2}{r^2}\left(1 - \frac{r_s}{r}\right)\right)^{1/2}.$$  (S57)

One of the sets of the tetrads for free falling observer with non-zero angular momentum is as follows $$(e_{\hat{0}})^\mu(x) =$$  (S58)

$$(e_{\hat{t}})^\mu(x) = \left(\frac{1}{(1-\frac{r_s}{r})}, -\sqrt{\frac{r_s}{r}} \cos \Theta(r), -\frac{1}{r}\sqrt{\frac{r_s}{r}} \frac{\sin \Theta(r)}{1-\frac{r_s}{r}}, 0\right)$$

$$(e_{\hat{1}})^\mu(x) = \left(-\sqrt{\frac{r_s}{r}} \frac{1}{(1-\frac{r_s}{r})}, \cos \Theta(r), \frac{1}{r}\frac{\sin \Theta(r)}{\sqrt{1-\frac{r_s}{r}}}, 0\right)$$

$$(e_{\hat{2}})^\mu(x) = \left(0, -\sin \Theta(r)\sqrt{1-\frac{r_s}{r}}, \frac{1}{r}\cos \Theta(r), 0\right)$$

$$(e_{\hat{3}})^\mu(x) = (e_\phi)^\mu(x) = (0, 0, 0, 1/r)$$

where $$\cos \Theta(r) = \sqrt{\left(1 - \frac{l^2}{rr_s}\left(1 - \frac{r_s}{r}\right)\right)}, \sin \Theta(r) = -\sqrt{\frac{l^2}{rr_s}\left(1 - \frac{r_s}{r}\right)}.$$

With the orthogonality condition, these tetrads can be rewritten more generally as $$(e_{\hat{0}})^\mu(x) =$$  (S59)

$$(e_{\hat{t}})^\mu(x) = \left(\frac{1}{(1-\frac{r_s}{r})}, -\sqrt{\frac{r_s}{r}} \cos \Theta(r), -\frac{1}{r}\sqrt{\frac{r_s}{r}} \frac{\sin \Theta(r)}{1-\frac{r_s}{r}}, 0\right)$$

-continued $$(e_{\hat{1}})^\mu(x) = \left(-\sqrt{\frac{r_s}{r}} \frac{\cos \tilde{\Theta}(r)}{(1-\frac{r_s}{r})},\right.$$

$$\cos \Theta(r) \cos \tilde{\Theta}(r) - \sin \Theta(r) \sin \tilde{\Theta}(r)\sqrt{1-\frac{r_s}{r}},$$

$$\left.\frac{1}{r}\frac{\sin \Theta(r) \cos \tilde{\Theta}(r)}{\sqrt{1-\frac{r_s}{r}}} + \frac{1}{r}\cos \Theta(r) \sin \tilde{\Theta}(r), 0\right)$$

$$(e_{\hat{2}})^\mu(x) = \left(\sqrt{\frac{r_s}{r}} \frac{\sin \tilde{\Theta}(r)}{(1-\frac{r_s}{r})},\right.$$

$$\cos \Theta(r)\frac{\sin \tilde{\Theta}(r)}{(1-\frac{r_s}{r})} - \sin \Theta(r) \cos \tilde{\Theta}(r)\sqrt{1-\frac{r_s}{r}},$$

$$\left.\frac{1}{r}\cos \Theta(r) \cos \tilde{\Theta}(r) - \frac{1}{r}\frac{\sin \Theta(r) \sin \tilde{\Theta}(r)}{\sqrt{1-\frac{r_s}{r}}}, 0\right)$$

$$(e_{\hat{3}})^\mu(x) = (e_\phi)^\mu(x) = (0, 0, 0, 1/r)$$

To get non-spinning frame, tetrads should be parallel transported. Thus, the following condition must hold $$u^\mu \nabla_\mu e_{\hat{a}}{}^t = 0,$$  (S60)

In other words, $$\frac{d}{dr}\tilde{\Theta}(r) = -\frac{l_{obs}}{2r^2 u^r}.$$  (S61)

Since sin Θ(r) is approximately the same as $$-\sqrt{\frac{l^2}{rr_s}},$$

we can deduce the following relation:

$$\frac{d}{dr}\Theta(r) \square \frac{l_{obs}}{2r^2 u^r} = \frac{d}{dr}\tilde{\Theta}(r).$$  (S62)

In other words, these tetrads can be written approximately as $$(e_{\hat{0}})^\mu(x) =$$

$$(e_t)^\mu(x) = \left(\frac{1}{\left(1-\frac{r_s}{r}\right)}, -\sqrt{\frac{r_s}{r}}\cos\Theta(r), -\frac{1}{r}\sqrt{\frac{r_s}{r}}\frac{\sin\Theta(r)}{1-\frac{r_s}{r}}, 0\right)$$

$$(e_{\hat{1}})^\mu(x) = (e_r)^\mu(x) == \left(-\sqrt{\frac{r_s}{r}}\frac{\cos\Theta(r)}{\left(1-\frac{r_s}{r}\right)},\right.$$

$$\cos 2\Theta(r) + \sin^2\Theta(r)\left(1-\sqrt{\left(1-\frac{r_s}{r}\right)}\right),$$

$$\left.\frac{1}{r}\frac{\sin 2\Theta(r)}{2}\left(1+\frac{1}{\sqrt{1-\frac{r_s}{r}}}\right), 0\right)$$

$$(e_{\hat{2}})^\mu(x) = (e_\theta)^\mu(x) == \left(\sqrt{\frac{r_s}{r}}\frac{\sin\Theta(r)}{\left(1-\frac{r_s}{r}\right)},\right.$$

$$-\frac{\sin 2\Theta(r)}{2}\left(1+\sqrt{\left(1-\frac{r_s}{r}\right)}\right),$$

$$\left.\frac{1}{r}\cos 2\Theta(r) + \frac{1}{r}\sin^2\Theta(r)\left(1-\frac{1}{\sqrt{1-\frac{r_s}{r}}}\right), 0\right)$$

$$(e_{\hat{3}})^\mu(x) = (e_\phi)^\mu(x) = (0, 0, 0, 1/r)$$

(S63)

By ignoring the first order of $$\frac{r_s}{r},$$

the physical meaning becomes much clearer. The tetrads can be written as $$(e_{\hat{0}})^\mu(x) = (e_t)^\mu(x) = \left(1, -\sqrt{\frac{r_s}{r}}\cos\Theta(r), -\frac{1}{r}\sqrt{\frac{r_s}{r}}\sin\Theta(r), 0\right)$$

$$(e_{\hat{1}})^\mu(x) =$$

$$(e_r)^\mu(x) == \left(-\sqrt{\frac{r_s}{r}}\cos\Theta(r), \cos 2\Theta(r), \frac{1}{r}\sin 2\Theta(r), 0\right)$$

(S64)

$$(e_{\hat{2}})^\mu(x) = (e_\theta)^\mu(x) == \left(\sqrt{\frac{r_s}{r}}\sin\Theta(r), -\sin 2\Theta(r), \frac{1}{r}\cos\Theta(r), 0\right).$$

$$(e_{\hat{3}})^\mu(x) = (e_\phi)^\mu(x) = (0, 0, 0, 1/r)$$

Thus, we can conclude that if the tetrads, which are non-spinning and free falling with non-zero angular momentum, are projected into 3-dimension space, they rotate by 2 times of $\Theta(r)$ when observer's moving direction rotates only by $\Theta(r)$. By the first order of angular momentum, l, and $$\frac{r_s}{r}$$

approximation, tetrads become $$(e_0)^\mu(x) = (e_t)^\mu(x) = \left(\frac{1}{(1-r_s/r)}, -\sqrt{\frac{r_s}{r}}, \frac{l}{r^2}, 0\right)$$

(S65)

$$(e_1)^\mu(x) = (e_r)^\mu(x) = \left(-\sqrt{\frac{r_s}{r}}\frac{1}{1-r_s/r}, 1, \frac{-2l}{\sqrt{r_s r^3}}, 0\right)$$

$$(e_2)^\mu(x) = (e_\theta)^\mu(x) = \left(\frac{-l}{r(1-r_s/r)}, \frac{l\left(2-\frac{r_s}{r}\right)}{\sqrt{r_s r}}, \frac{1}{r}, 0\right)$$

$$(e_3)^\mu(x) = (e_\phi)^\mu(x) = (0, 0, 0, 1/r)$$

The ILLT matrix is then given by $$(\lambda_d^c) = \begin{pmatrix} 0 & -\varepsilon_r^2\frac{k^t r_s}{2r^2} - \varepsilon_r\sqrt{\frac{r_s}{r}}\frac{k^r}{2r} & 0 & \varepsilon_r k^\phi\sqrt{\frac{r_s}{r}} \\ -\varepsilon_r^2\frac{k^t r_s}{2r^2} - \varepsilon_r\sqrt{\frac{r_s}{r}}\frac{k^r}{2r} & 0 & \varepsilon_l^2\frac{k^r l}{\sqrt{r^2 r_s}} & k^\phi \\ 0 & -\varepsilon_l^2\frac{k^r l}{\sqrt{r^2 r_s}} & 0 & \varepsilon_l^2\frac{2k^\phi l}{\sqrt{rr_s}} \\ \varepsilon_r k^\phi\sqrt{\frac{r_s}{r}} & -k^\phi & -\varepsilon_l^2\frac{2k^\phi l}{\sqrt{rr_s}} & 0 \end{pmatrix}$$

(S66)

Thus, the observer, falling free with non-zero angular momentum, sees the non-zero Wigner angle as $$\tilde{\psi} = -\varepsilon_l^2\frac{k^r l}{\sqrt{r^3 r_s}}$$

(S67)

Tetrads for Free Falling Observers with Non-Zero Angular Momentum II (Circular Orbit)

In this case, we also assume that e=1 for the simplicity of the calculations. The observer who is falling freely with angular momentum with e=1 has the 4-velocity vector such that $$u(\tau) = (e_{\hat{i}})^\mu(x) = \left(1/(1-r_s/r), u^r, 0, \frac{l}{r^2}\right) \quad (S68)$$

where $$u^r = -\left(\frac{r_s}{r} - \frac{l^2}{r^2}\left(1-\frac{r_s}{r}\right)\right)^{1/2} \quad (S69)$$

In addition, by forcing the radial component of 4-velocity vector to be null, we can get $$(e_{\hat{0}})^\mu(x) = (e_t)^\mu(x) = \left(\frac{1}{\sqrt{1-\frac{3r_s}{2r}}}, 0, \frac{1}{r}\sqrt{\frac{r_s}{2r}}\frac{1}{\sqrt{1-\frac{3r_s}{2r}}}, 0\right) \quad (S70)$$

$$(e_{\hat{1}})^\mu(x) = (e_r)^\mu(x)\left(-\sqrt{\frac{r_s}{2r}}\frac{\sin\tilde{\Theta}(r)}{\sqrt{1-\frac{3r_s}{2r}}\sqrt{1-\frac{r_s}{r}}},\right.$$

$$\left.\sqrt{1-\frac{r_s}{r}}\cos\tilde{\Theta}(r), -\frac{1}{r}\frac{\sqrt{1-\frac{r_s}{r}}\sin\tilde{\Theta}(r)}{\sqrt{1-\frac{3r_s}{2r}}}, 0\right)$$

$$(e_{\hat{2}})^\mu(x) = (e_\theta)^\mu(x)\left(\sqrt{\frac{r_s}{2r}}\frac{\cos\tilde{\Theta}(r)}{\sqrt{1-\frac{3r_s}{2r}}\sqrt{1-\frac{r_s}{r}}},\right.$$

$$\left.\sqrt{1-\frac{r_s}{r}}\sin\tilde{\Theta}(r), \sqrt{1-\frac{r_s}{r}}, \frac{1}{r}\frac{\sqrt{1-\frac{r_s}{r}}\cos\tilde{\Theta}(r)}{\sqrt{1-\frac{3r_s}{2r}}}, 0\right)$$

$$(e_{\hat{3}})^\mu(x) = (e_\phi)^\mu(x) = (0, 0, 0, \csc\theta/r)$$

Likewise, by adding non-spinning condition, we can get $$\tilde{\Theta}(r) = \sqrt{1-\frac{3r_s}{2r}}(\theta - \theta_0). \quad (S71)$$

By ignoring the first order of rs/r, tetrads are written as $$(e_{\hat{0}})^\mu(x) = (e_t)^\mu(x) = \left(1, 0\frac{1}{r}\sqrt{\frac{r_s}{2r}}, 0\right) \quad (S72)$$

$$(e_{\hat{1}})^\mu(x) =$$

$$(e_r)^\mu(x)\left(-\sqrt{\frac{r_s}{2r}}\sin\tilde{\Theta}(r), \cos\tilde{\Theta}(r), -\frac{1}{r}\sin\tilde{\Theta}(r), 0\right)$$

$$(e_{\hat{2}})^\mu(x) = (e_\theta)^\mu(x)\left(\sqrt{\frac{r_s}{2r}}\cos\tilde{\Theta}(r), \sin\tilde{\Theta}(r), \frac{1}{r}\cos\tilde{\Theta}(r, 0)\right)$$

$$(e_{\hat{3}})^\mu(x) = (e_\phi)^\mu(x) = (0, 0, 0, \csc\theta/r)$$

where $\tilde{\Theta}(r) = (\theta - \theta_0)$.

That is, by projecting tetrads into 3-dimensional space, one can see that tetrads rotate by $-\theta$ when observer moves by $r\theta$. This is quite a non-relativistic effect, since the rotation, induced by parallel transportation condition, is just compensation of the effect of spherical coordinate system. In Fig. S1, the components, classical and quantum, of the Wigner rotation for an free-falling observer with non-zero angular momentum for the circular orbit. We set angular momentum of observers as $0.4\sqrt{r_s r_{earth}}$.

From Wigner Angle to the Rotation Angle of Polarization $$\varepsilon'^\mu_\pm(\hat{k}') \equiv D(\Lambda)\varepsilon^\mu_\pm(\hat{k}') = R(\Lambda\hat{k})R_z(\psi(\Lambda,\vec{n}))R(\hat{k})^{-1}\varepsilon^\mu_\pm(\hat{k}) \quad (S73)$$

$$\varepsilon^\mu_\phi(\hat{k}) = \frac{1}{\sqrt{2}}\left(e^{i\phi}\varepsilon^\mu_+(\hat{k}) + e^{-i\phi}\varepsilon^\mu_-(\hat{k})\right) = R(\hat{k})\begin{bmatrix}0\\\cos\phi\\\sin\phi\\0\end{bmatrix} \equiv R(\hat{k})\tilde{\varepsilon}^\mu_\phi(\hat{z}) \quad (S74)$$

$$e'^\mu_{\phi'}(\hat{k}') = \quad (S75)$$

$$\frac{1}{\sqrt{2}}\left(e^{i\phi'}\varepsilon^\mu_+(\hat{k}') + e^{-i\phi'}\varepsilon^\mu_-(\hat{k}')\right) = R(\Lambda\hat{k})\begin{bmatrix}0\\\cos\phi'\\\sin\phi'\\0\end{bmatrix} \equiv (\Lambda\hat{k})\tilde{\varepsilon}'^\mu_{\phi'}(\hat{z})$$

$$\tilde{\varepsilon}'^\mu_{\phi'}(\hat{z}) = R_z(\psi(\Lambda,\vec{n}))\tilde{\varepsilon}^\mu_\phi(\hat{z}) \quad (S76)$$

$$\therefore \phi' = \phi + \psi \quad (S77)$$

This result tells us Wigner angle is the same with polarization rotation angle only in the standard frame. However, our 3-axis is not parallel to the wave vector. Therefore, by decomposing Wigner rotation into other rotations, we can get the rotation angle about wave vector, induced by Wigner rotation, which corresponds to the angle of polarization rotation. If a rotation is denoted by (n, φ), the rotation can be decomposed into three consecutive rotations denoted by $(n_i, \varphi_i)$ with the axis unit vectors, $n_i$, and the corresponding rotation angles, $\varphi_i$. When mutually orthogonal axes are considered, the following relation holds[Decomposition of a Finite Rotation . . . ], $$\sin\varphi_3 = \frac{b_1 b_2(1-\cos\varphi) + b_3\sin\varphi}{\cos\varphi_2} \quad (S78)$$

where $b_i = n \cdot n_i$. Since we deal with infinitesimal angles, we can get $$\varphi_3 = b_3\varphi \quad (S79)$$

In our case, the unit vectors, $n, n_i$, are defined by $$n_i = \frac{\partial}{\partial x^i}, n = \frac{k^i}{k^{\hat{i}}}\frac{\partial}{\partial x^i}, \quad (S80)$$

The coefficient, $b_i$, is obtained from the definition $$b_i = n \cdot n_i = \frac{k^{\hat{i}}}{k^{\hat{i}}} = \frac{\eta^{\hat{i}\hat{i}}e^\mu_{\hat{i}}(g_{\mu\mu}k^\mu)}{\eta^{\hat{0}\hat{0}}e^\mu_{\hat{i}}(g_{\mu\mu}k^\mu)} \cong \frac{rk^\phi}{k^{\hat{i}}} \quad (i = 1, 2, 3) \quad (S81)$$

Therefore, Eq. (S78) becomes $$\text{polarization angle} = \frac{rk^\phi}{k^t} \times (\text{Wigner rotation angle}) \quad \text{(S82)}$$

The corresponding infinitesimal polarization rotation angle is $$\tilde{\psi} = -\varepsilon_{\hat{t}}^2 \frac{k^\phi k^r l}{k^t \sqrt{rr_s}}. \quad \text{(S83)}$$

Torsion-Free

Every tetrads used in this paper is torsion-free. It is easy to check whether the local frame described by tetrads has torsion or not by calculating components of torsion tensor in the local basis, which are defined as:

$$T^{\hat{a}}{}_{\hat{b}\hat{c}} = \Gamma_{\hat{b}\hat{c}}{}^{\hat{a}} - \Gamma_{\hat{c}\hat{b}}{}^{\hat{a}} - c_{\hat{b}\hat{c}}{}^{\hat{a}} \quad \text{(S84)}$$

where and $\Gamma_{\hat{b}\hat{c}}{}^{\hat{a}} = e^{\hat{a}}_\mu e_{\hat{b}}{}^\nu \nabla_\nu e_{\hat{c}}{}^\mu$ and $c_{\hat{a}\hat{b}}{}^{\hat{c}} = \Gamma^{\hat{c}}{}_{\hat{a}\hat{b}} - \Gamma^{\hat{c}}{}_{\hat{b}\hat{a}}$.

Method of Correcting Gravity-Induced Error in Quantum Cryptography System

From these results, a method of correcting gravity-induced error in quantum cryptography system, which is performed by an electronic device, comprises receiving a distance to a satellite that receives polarized photon from a sender and transmits the polarized photon to a receiver, receiving an angular momentum per unit mass of the satellite, and calculating a rotation amount of the polarized photon, which is induced by a warp of space due to gravity by using the distance to the satellite and the angular momentum per unit mass of the satellite.

The rotation of the polarized photon is calculated by the following equation, $$\sin \Theta(r) \cong -\frac{l_{obs}}{\sqrt{rr_s}}\sqrt{1 - \frac{1-r_s}{r}}$$

wherein '$2\Theta$' is rotational amount of polarized photon, '$l_{obs}$' is the angular momentum per unit mass of the satellite, '$r$' is the distance to the satellite, and '$r_s$' is the Schwarzschild radius of the Earth.

Quantum Cryptography Authentication Method

Quantum Key Distribution is a cryptographic system for secure communication, which is proposed by C. H. Bennett and G. Brassard in 1984. While most of the existing cryptosystems are mostly based on mathematical complexity, quantum cryptography is characterized by natural phenomena and creates a one-time pad used for cryptography. This is one of the ideal ways. If a wiretaker intrudes in the middle, its existence is revealed, and the signal is distorted, so the wiretaker has security that cannot obtain accurate information. It is the most representative quantum cryptography system.

FIG. 6 is a view for explaining a quantum cryptography authentication method.

Referring to FIG. 6, in the quantum cryptography authentication method, first, a sender (server) generates arbitrary bits (step 1). At this time, it is preferable that the random bits are randomly selected. For example, it is assumed that the selected arbitrary bit is [0 1 1 0 1 0 0 1] as shown in FIG. 6.

Then, the sender (server) selects a transmission filter to transmit the selected arbitrary bits (step 2). The transmission filter can be either a +-filter or a ×-filter. The +-filter and the ×-filter both filter linearly polarized light, and the +-filter filters light that vibrates linearly at 90/270 degrees or light that vibrates linearly at 0/180 degrees, and ×-filter filters light that vibrates linearly at 45/225 degrees or light that vibrates linearly at 135/315 degrees. At this time, it is preferable that the sender (server) randomly selects from the +-filter and the ×-filter. For example, suppose that [+ + × + × × ×+] is selected as a filter for transmitting each bit of [0 1 1 0 1 0 0 1].

On the other hand, the sender (server) and the receiver (user terminal) share the following conditions. For example, 0 bit corresponds to 90/270 degree linear polarization passing through the +-filter or to 45/225 degree linear polarization passing through the ×-filter, and 1 bit corresponds to 0/180 degree linear polarization passing through the +-filter, or to 135/315 degrees passing through the ×-filter.

Then, the polarization of the photons filtered and transmitted by the selected transmission filter is as shown in step 3 of FIG. 6.

Meanwhile, the receiver (user terminal) selects a reception filter to receive the polarized photons (step 4). At this time, it is preferable that the receiver (user terminal) randomly selects the reception filter from the +-filter and the ×-filter. Such a selection may be made in advance before reception, or may be made simultaneously with reception. For example, it is assumed that the receiver (user terminal) has selected [+ × × × + × +] as shown in FIG. 6.

In this state, the result of measuring the photon transmitted by the sender (server) by the receiver by using the selected reception filters is shown in FIG. 6. In the measurement process, if the direction of vibration of the polarized light and the direction of the reception filter do not match, the state of the photon changes according to the reception filter. For example, in the case of the second bit 1, the vibration of the transmitted photon was 0/180 degree linear polarization, but it can be seen that it changed to 45/225 degree linear polarization through the ×-filter. However, it may be changed to linearly polarized light at 135/315 degrees.

Thereafter, the sender (server) and the receiver (user terminal) share information of the transmission filter and the reception filter (step 6). Thereafter, by selecting bits where the transmission filter and the reception filter match, the sender generates a first secret key and the receiver generates a second secret key. That is, among the bits of [0 1 1 0 1 0 0 1], bits [0 1 0 1] of first, third, sixth, and eighth columns are selected as first and second secret keys, respectively. Thereafter, the receiver (user terminal) may transmit the generated secret key to the sender (server), and compare the first secret key held by the sender with the second secret key received from the receiver, thereby authenticating the receiver.

On the other hand, when an interceptor measures the photons by selecting reception filter in order to intercept the photons transmitted from the sender (server) in the middle, there is no problem when the same reception filters are selected, but states of polarization of photons are changed when the reception filters of the interceptor are different from the reception filters of the receiver, and the changed state of the polarization of the photons changed again. Therefore, although the transmission filter of the sender (server) and the reception filter of the receiver (user terminal) are the same, it is changed from 0→1, 1→0, so that the existence of the interceptor can be known. Therefore, when the number of bits increases, the interceptor must select the same reception filters as the receiver's reception filters, so that the intercepting becomes substantially impossible.

Figure 7:
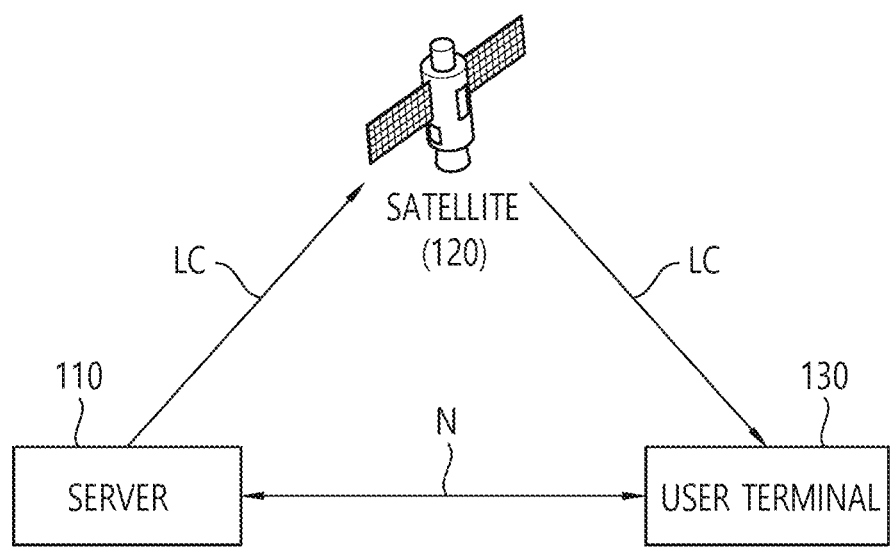
FIG. 7 is a diagram showing the relationship between the subjects performing the quantum cryptography authentication method according to the present invention.

FIG. 7 is a diagram showing the relationship between the subjects performing the quantum cryptography authentication method according to the present invention.

Receiving to FIG. 7, in order to perform the quantum cryptography authentication method described above, a case of transmitting photons through the satellite 120 will be described.

When the optical cable is not connected, the server 110 transmits a photon to the user terminal 130 through the satellite 120. In FIG. 7, LC denotes optical communication and N denotes a communication network composed of at least one of a wired communication network and a wireless communication network.

That is, photon transmission may be performed through a free space denoted by LC, and information exchange for a transmission filter and a reception filter may be performed through the communication network N. Alternatively, information exchange for the transmission filter and the reception filter may also be performed through the satellite 120 through communication using electromagnetic waves.

As described above, the step of correcting the rotation of the polarization of the photons induced by warpage of space-time due to gravity may be added to such quantum cryptography authentication through the satellite.

That is, according to a method of quantum cryptography authentication according to an exemplary embodiment of the present invention, a server generates arbitrary bits, selects transmission filters transmit the arbitrary bits, and transmits photons polarized according to the transmission filter to a satellite. Since this process has been described above, further detailed description will be omitted.

And, a user terminal selects a reception filter to receive the photons, receives a distance to the satellite and an angular momentum per unit mass of the satellite, and calculates a rotation amount of polarized photons, which is induced by warping of space due to gravity by using the distance to the satellite and the angular momentum per unit mass of the satellite.

In this case, the user terminal calculates the rotation of the polarized photon by the following equation, $$\sin \Theta(r) \cong -\frac{l_{obs}}{\sqrt{rr_s}}\sqrt{1-\frac{1-r_s}{r}}$$

wherein '4Θ' is rotational amount of polarized photon, '$l_{obs}$' is the angular momentum per unit mass of the satellite, 'r' is the distance to the satellite, and '$r_s$' is the Schwarzschild radius of the Earth.

That is, in the process that the server 110 transmits the photon to the satellite 120, the polarization of the photon is rotated by 2Θ, and in the process that the satellite 120 transmits the photon to the user terminal 130, the polarization of the photon is rotated by 2Θ again so that the total rotation between the server 110 and the user terminal 130 becomes 4Θ.

Figure 8:
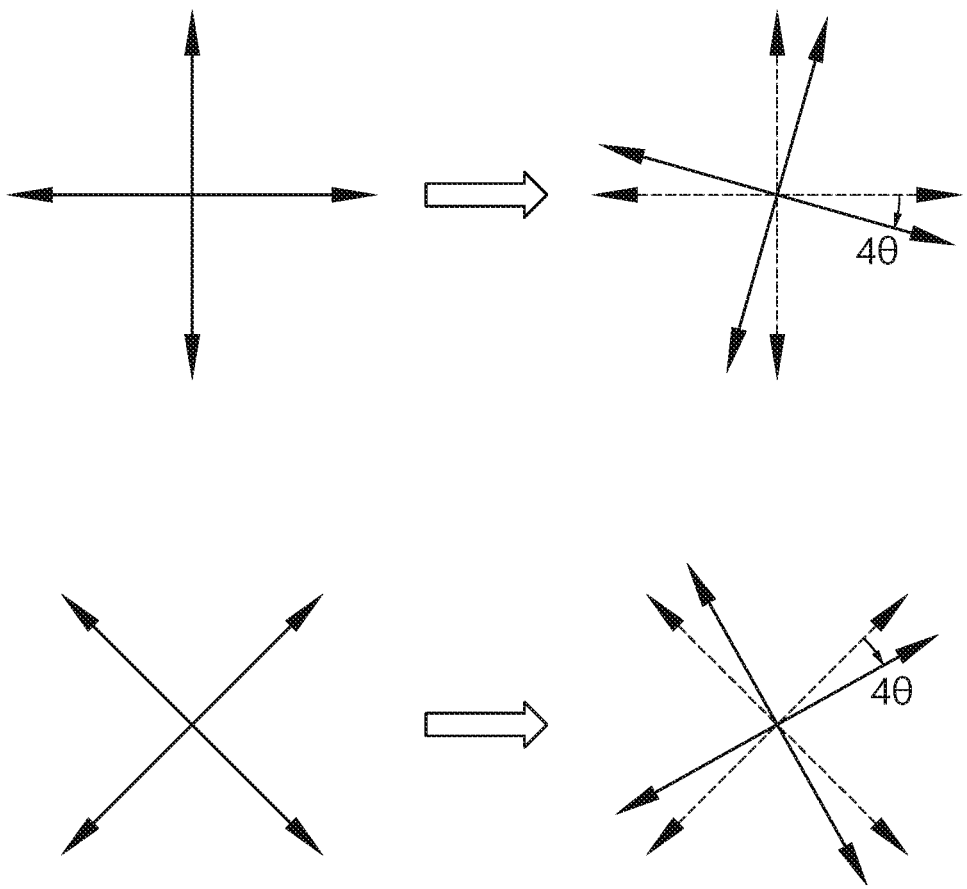
FIG. 8 is a conceptual diagram showing before and after correction of the reception filter of FIG. 6.

The user terminal 130 rotates the reception filter as shown in FIG. 8 in consideration of the rotation amount of the polarization.

Then, the user terminal 130 receives the polarized photons transmitted from the satellite through the reception filter. Then, the sever 110 and the user terminal 130 share information of the transmission filter and the reception filter with each other, and generate a first secret key and a second secret key, respectively through the shared information of the transmission filter and the reception filter. Then, the user terminal 130 transmits the second secret key to the server 110, and the server 110 checks whether the first secret key and the second secret key match. Since this process has been described above, further detailed description will be omitted.

For example, the user terminal 130 may receive the distance to the satellite and the angular momentum per unit mass of the satellite from the satellite 120 or the server 130.

For example, the server 110 and the user terminal 130 may share the information of the transmission filter and the reception filter through a wired communication network or a wireless communication network.

For example, the transmission filter and the reception filter may be selected randomly by the server 110 and the user terminal 130, respectively.

Figure 9:
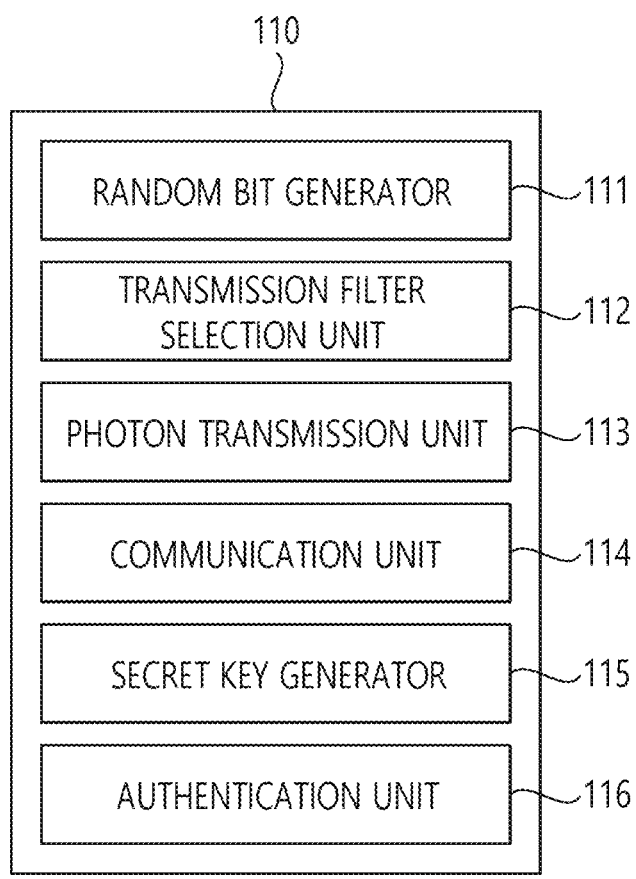
FIG. 9 is a block diagram showing a server according to an exemplary embodiment of the present invention.

FIG. 9 is a block diagram showing a server according to an exemplary embodiment of the present invention.

Referring to FIG. 7 and FIG. 9, a server 110 according to an exemplary embodiment of the present invention comprises a random bit generator 111, a transmission filter selection unit 112, a photon transmission unit 113, a communication unit 114, a secret key generator 115 and an authentication unit 116.

The random bit generator 111 generates random bits.

The transmission filter selection unit 112 selects a transmission filter for transmitting polarized photon. In this case, the transmission filter selection unit 112 may select the transmission filter randomly.

The photon transmission unit 113 converts the generated random bits into photons polarized through a selected transmission filter and transmits the photons.

The communication unit 114 receives information of reception filter from a user terminal 130 and transmits information of the transmission filter information to the user terminal 130.

The secret key generator 115 generates a first secret key using the random bits according to the information of the reception filter and the transmission filter.

The authentication unit 116 performs a user authentication by receiving a second secret key from the user terminal 130 and by comparing the second secret key with the first secret key.

Figure 10:
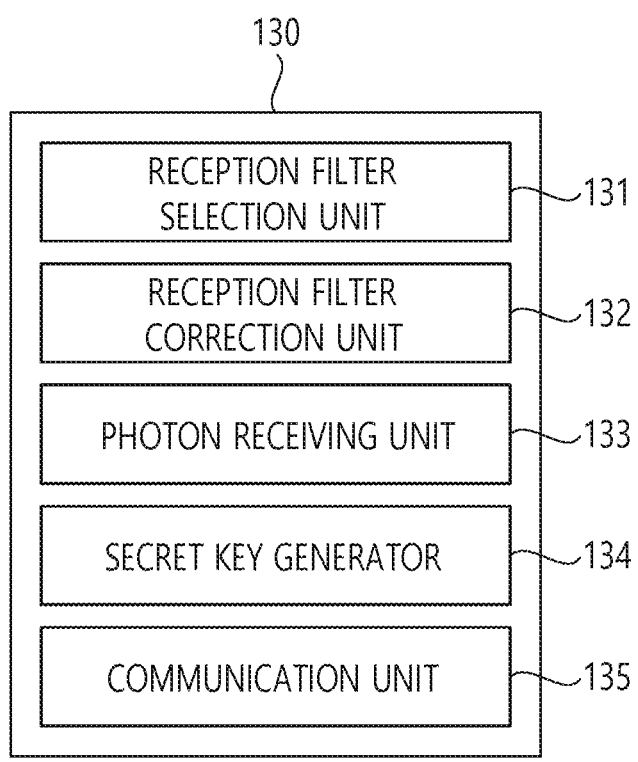
FIG. 10 is a block diagram showing a user terminal according to an exemplary embodiment of the present invention.

FIG. 10 is a block diagram showing a user terminal according to an exemplary embodiment of the present invention.

Referring to FIG. 7 and FIG. 10, a user terminal 130 according to an exemplary embodiment of the present invention comprises a reception filter selection unit 131, a reception filter correction unit 132, a photon receiving unit 133, a communication unit 135 and a secret key generator 134.

The reception filter selection unit 131 selects a reception filter for receiving polarized photons transmitted from a server 110.

The reception filter correction unit 132 corrects an angle of the reception filter.

The photon receiving unit 133 receives polarized photons from a satellite through the corrected reception filter.

The communication unit 135 receives information of a transmission filter from the server 110 and transmits information of the reception filter to the server 110.

The secret key generator 134 generates a second secret key by using information of polarized photons, the information of transmission filter, and the information of the reception filter.

Then, the communication unit 135 transmits the second secret key to the server 110.

For example, the reception filter correction unit 132 calculates the rotation of the polarized photon is calculated by the following equation, $$\sin \Theta(r) \cong -\frac{l_{obs}}{\sqrt{rr_s}} \sqrt{1-\frac{1-r_s}{r}}$$

wherein '$l_{obs}$' is the angular momentum per unit mass of the satellite, 'r' is the distance to the satellite, and '$r_s$' is the Schwarzschild radius of the Earth, and rotates the reception filter by amount of 4Θ.

For example, the reception filter selection unit 132 selects the reception filter randomly.

As described above, according to the present invention, when an optical cable is not installed and photons are transmitted through an artificial satellite, the accuracy of cryptographic authentication can be improved by correcting an error of polarization of photons, which is induced by curved space-time due to gravity.

It will be apparent to those skilled in the art that various modifications and variation may be made in the present invention without departing from the spirit or scope of the invention. Thus, it is intended that the present invention cover the modifications and variations of this invention provided they come within the scope of the appended claims and their equivalents.

What is claimed is:

1. A method of correcting gravity-induced error in quantum cryptography system, which is performed by an electronic device, the method comprising:
   receiving a distance to a satellite that receives polarized photon from a sender and transmits the polarized photon to a receiver;
   receiving an angular momentum per unit mass of the satellite; and
   calculating a rotation amount of the polarized photon, which is induced by a warp of space due to gravity by using the distance to the satellite, a Schwarzschild radius of the Earth, and the angular momentum per unit mass of the satellite.

2. The method of claim 1, wherein the rotation of the polarized photon is calculated by the following equation, $$\sin \Theta(r) \cong -\frac{l_{obs}}{\sqrt{rr_s}} \sqrt{1-\frac{r_s}{r}},$$

wherein '2Θ' is rotational amount of polarized photon, '$l_{obs}$' is the angular momentum per unit mass of the satellite, 'r' is the distance to the satellite, and '$r_s$' is the Schwarzschild radius of the Earth.

3. A method of quantum cryptography authentication, comprising:
   generating, by a server, an arbitrary bit;
   selecting, by the server, a transmission filter to transmit the arbitrary bit;
   transmitting, by the server, photons polarized according to the transmission filter to a satellite;
   selecting, by a user terminal, a reception filter to receive the photons;
   receiving, by the user terminal, a distance to the satellite and an angular momentum per unit mass of the satellite;
   calculating, by the user terminal, a rotation amount of polarized photons, which is induced by warping of space due to gravity by using the distance to the satellite and the angular momentum per unit mass of the satellite;
   rotating, by the user terminal, the reception filter according to of the rotation amount of the polarization;
   receiving, by the user terminal, polarized photons transmitted from the satellite through the reception filter;
   sharing information of the transmission filter and the reception filter, by the server and the user terminal, with each other;
   generating a first secret key by the server and a second secret key by the user terminal through the shared information of the transmission filter and the reception filter;
   transmitting, by the user terminal, the second secret key to the server; and
   checking, by the server, whether the first secret key and the second secret key match.

4. The method of claim 3, wherein the user terminal calculates the rotation of the polarized photon is calculated by the following equation, $$\sin \Theta(r) \cong -\frac{l_{obs}}{\sqrt{rr_s}} \sqrt{1-\frac{r_s}{r}},$$

wherein '4Θ' is rotational amount of polarized photon, '$l_{obs}$' is the angular momentum per unit mass of the satellite, 'r' is the distance to the satellite, and '$r_s$' is the Schwarzschild radius of the Earth.

5. The method of claim 3, wherein the user terminal receives the distance to the satellite and the angular momentum per unit mass of the satellite from the satellite or the server.

6. The method of claim 3, wherein the server and the user terminal share the information of the transmission filter and the reception filter through a wired communication network or a wireless communication network.

7. The method of claim 3, wherein the transmission filter and the reception filter are selected randomly by the server and the user terminal, respectively.

8. A server comprising:
   a random bit generator for generating random bits;
   a transmission filter selection unit for selecting a transmission filter for transmitting polarized photon;
   a photon transmission unit converting the generated random bits into photons polarized through a selected transmission filter and transmitting the photons;
   a communication unit that receives information of reception filter from a user terminal and transmits information of the transmission filter information to the user terminal;
   a secret key generator for generating a first secret key using the random bits according to the information of the reception filter and the transmission filter; and
   an authentication unit performing a user authentication by receiving a second secret key from the user terminal and by comparing the second secret key with the first secret key.

9. The server of claim 8, wherein the transmission filter selection unit selects the transmission filter randomly.

10. A user terminal comprising:
a reception filter selection unit selecting a reception filter for receiving polarized photons transmitted from a server;
a reception filter correction unit correcting an angle of the reception filter;
a photon receiving unit receiving polarized photons from a satellite through the corrected reception filter;
a communication unit receiving information of a transmission filter from a server and transmitting information of the reception filter to the server; and
a secret key generator generating a second secret key by using information of polarized photons, the information of transmission filter, and the information of the reception filter; and
wherein the communication unit transmits the second secret key to the server.

11. The user terminal of claim 10, wherein the reception filter correction unit calculates the rotation of the polarized photon is calculated by the following equation, $$\sin \Theta(r) \cong -\frac{l_{obs}}{\sqrt{rr_s}} \sqrt{1 - \frac{r_s}{r}},$$

wherein '$l_{obs}$' is the angular momentum per unit mass of the satellite, 'r' is the distance to the satellite, and '$r_s$' is the Schwarzschild radius of the Earth, and rotates the reception filter by amount of 4 $\Theta$.

12. The user terminal of claim 10, wherein the reception filter selection unit selects the reception filter randomly.

* * * * *